(12) United States Patent
Geren et al.

(10) Patent No.: US 10,356,990 B1
(45) Date of Patent: Jul. 23, 2019

(54) WATER CONSERVATION APPARATUS AND METHOD FOR PROGRAMMABLE IRRIGATION CONTROLLERS

(71) Applicant: Sprinkl.IO LLC, Richardson, TX (US)

(72) Inventors: Noel Lee Geren, Frisco, TX (US); Daniel Morgan Pruessner, Richardson, TX (US)

(73) Assignee: Sprinkl.IO LLC, Richardson, TX (US)

( * ) Notice: Subject to any disclaimer, the term of this patent is extended or adjusted under 35 U.S.C. 154(b) by 295 days.

(21) Appl. No.: 15/365,174

(22) Filed: Nov. 30, 2016

(51) Int. Cl.
| | | |
|---|---|---|
| *G05B 15/02* | (2006.01) | |
| *A01G 25/16* | (2006.01) | |
| *G08C 17/02* | (2006.01) | |
| *G05D 7/06* | (2006.01) | |
| *G05B 19/042* | (2006.01) | |

(52) U.S. Cl.
CPC ....... *A01G 25/165* (2013.01); *G05B 19/0426* (2013.01); *G05D 7/0635* (2013.01); *G08C 17/02* (2013.01); *G05B 2219/15117* (2013.01); *G05B 2219/2625* (2013.01)

(58) Field of Classification Search
CPC .............................. A01G 25/165; G05B 15/02
See application file for complete search history.

(56) References Cited

U.S. PATENT DOCUMENTS

| | | |
|---|---|---|
| 7,363,113 B2 | 4/2008 | Runge et al. |
| 7,789,321 B2 | 9/2010 | Hitt |
| 7,899,581 B1 | 3/2011 | Woytowitz |
| 7,962,244 B2 | 6/2011 | Alexanian |
| 8,260,466 B2 | 9/2012 | Altieri et al. |
| 8,396,603 B2 | 3/2013 | Savelle, Jr. |
| 8,588,990 B2 | 11/2013 | Caceres et al. |
| 2010/0145530 A1 | 6/2010 | Nickerson et al. |
| 2011/0170239 A1 | 7/2011 | Nelson et al. |
| 2012/0303168 A1* | 11/2012 | Halahan ............... A01G 25/165 700/284 |
| 2015/0005961 A1 | 1/2015 | Endrizzi et al. |
| 2015/0005962 A1 | 1/2015 | Endrizzi et al. |

* cited by examiner

*Primary Examiner* — Thomas L Dickey
(74) *Attorney, Agent, or Firm* — Patterson Intellectual Property Law, P.C.; Gary L. Montle; Jerry Turner Sewell

(57) ABSTRACT

A water conservation apparatus is connectable to a legacy irrigation controller to provide access to the irrigation controller to enable a remote user to selectively disable watering irrespective of the watering schedule programmed in the irrigation controller. The apparatus is connectable to the rain sensor of irrigation controllers having rain sensor connections. In irrigation controllers not having rain sensor connections, the apparatus is connectable to the common line of the valve control lines to selectively interrupt current to the valves. The apparatus is connectable to a Wi-Fi router to enable communications to a cloud-based server such that the apparatus is able to receive control signals from the server to selectively disable watering based on current and predicted weather conditions.

16 Claims, 16 Drawing Sheets

WATER CONSERVATION APPARATUS AND METHOD FOR PROGRAMMABLE IRRIGATION CONTROLLERS

BACKGROUND OF THE INVENTION

Field of the Invention

The disclosure relates to irrigation systems having programmable controllers. More particularly, the apparatus and method described herein provide an adapter that enables a conventional programmable irrigation controller to be controlled remotely to override a programmed irrigation schedule to prevent irrigation during rainy conditions, when rain is predicted and at other times without modifying the programmed irrigation schedule.

Description of the Related Art

Programmable irrigation controllers are well-known and are available in a number of different configurations. Historically, programmable irrigation controllers included motor-driven timers that selectively turned on irrigation valves at selected times of the day, on selected days of the week and for selected time durations. The irrigation controllers included a power source at a selected voltage (e.g., 24 volts AC in some systems). The voltage from the power source was first routed to a first selected valve to enable water to flow to sprinklers in a first irrigation area for a first time duration. The voltage from the power source was then routed to a second selected valve to enable water to flow to sprinklers in a second irrigation area for a second time duration. Further valves were subsequently enabled to water additional irrigation areas. The irrigation sequence may have been repeated on a daily basis, may have occurred on certain days of the week, or may have skipped certain days. Setting up the original motor-driven timers was time-consuming and could be challenging to many users.

Over the years, the irrigation controllers with motor-driven timers have been replaced with fully electronic systems with liquid crystal displays (LCDs) and with much greater flexibility in programming the irrigation schedules for multiple irrigation areas. For example, some irrigation areas can be programmed to water on a daily basis, other irrigation areas can be programmed to water on certain days of the week, and other irrigation areas can be programmed to water multiple times in a single day. Regardless of the flexibility of the more recent programmable controllers, many controllers will adhere to the programmed irrigation schedule even while the irrigation areas are being irrigated naturally during a rainfall. It is not unusual to drive by a grassy area during a heavy rainfall and see the sprinklers operating at the same time.

Many conventional irrigation systems have rain sensor input terminals that can be electrically connected to a rain sensor that collects and accumulates rain. When a sufficient amount of water is accumulated in the sensor, the sensor opens a circuit between the input terminals that causes the programmable controller to discontinue the programmed irrigation schedule until the accumulated rainfall has dissipated (e.g., by evaporation). Such rain sensors may be adequate if the rainfall occurs before the beginning of a scheduled irrigation cycle; however, if the rainfall occurs during or after a scheduled irrigation cycle, the rain sensor is ineffective in preventing redundant irrigation. Conventional rain sensors have the further disadvantage that the sensors have to be positioned for unobstructed exposure to rainfall. Accordingly, many rain sensors are mounted on roofs where the rain sensors cannot be inspected easily to verify that the sensors are still operational. In any case, it is not unusual for a conventional programmable irrigation controller coupled to a rain sensor to continue to operate during or shortly before a rainstorm.

More recently, irrigation controllers have become available that are connectable to remote systems (e.g., the Internet) to enable the irrigation controllers to receive weather information. Such irrigation controllers can anticipate rainfall and other weather conditions to thereby reduce the occurrences of programmed irrigation occurring during heavy rainfalls, for example. Such irrigation controllers are more expensive than conventional irrigation controllers. Furthermore, upgrading to such irrigation controllers may require a homeowner or other user to discard an otherwise fully operational irrigation controller.

SUMMARY OF THE INVENTION

Because of the extensive installed base of conventional (non-networked) irrigation controllers, a need exists for an apparatus that adapts a conventional irrigation controller without remote access (e.g., access via the Internet) to a fully network accessible irrigation controller that can be programmed to prevent irrigation when rainfall is occurring or is predicted to occur. The apparatus and method disclosed herein are responsive the need.

One aspect of the embodiment disclosed herein is a water conservation apparatus connectable to a legacy irrigation controller to provide access to the irrigation controller to enable a remote user to selectively disable watering irrespective of the watering schedule programmed in the irrigation controller. The apparatus is connectable to the rain sensor of irrigation controllers having rain sensor connections. In irrigation controllers not having rain sensor connections, the apparatus is connectable to the common line of the valve control lines to selectively interrupt current to the valves. The apparatus is connectable to a Wi-Fi router to enable communications to a cloud-based server such that the apparatus is able to receive control signals from the server to selectively disable watering based on current and predicted weather conditions.

One aspect of the embodiments disclosed herein is a water conservation apparatus that comprises an enclosure and an electronic circuit board housed within the enclosure. The electronic circuit board has at least a first terminal and a second terminal. The first terminal and the second terminal are electrically connectable to a non-networked irrigation controller. Electronic circuitry on the electronic circuit board selectively electrically interconnects and disconnects the first terminal and the second terminal. The electronic circuitry further includes a radio frequency (RF) communication module to selectively receive RF communications. The electronic circuitry is responsive to at least a first RF communication to electrically interconnect the first terminal and the second terminal. The electronic circuitry is responsive to at least a second RF communication to electrically disconnect the first terminal and the second terminal.

In certain embodiments, the water conservation apparatus sends and receives RF communications to and from a Wi-Fi router. The Wi-Fi router communicates with a messaging server via the Internet to receive commands from the messaging server and to forward the commands to the electronic circuitry as the first RF communication and the second RF communication. In certain embodiments, the water conservation apparatus also transmits parameters to and receives parameters from a smartphone or other computing device via a Bluetooth interconnection during a setup process. The parameters include information to establish communications between the water conservation apparatus and the Wi-Fi router. In certain embodiments, the water conservation apparatus periodically sends RF communications to the messaging server via the Wi-Fi router to establish and maintain an Internet communications channel between the water conservation apparatus and the messaging server. In certain embodiments, electrically interconnecting the first terminal and the second terminal of the electronic circuit board enables the non-networked irrigation controller to operate in accordance with a watering schedule programmed into the irrigation controller; and electrically disconnecting the first terminal and the second terminal of the electronic circuit board disables the non-networked irrigation controller from operating in accordance with the watering schedule programmed into the irrigation controller. In certain embodiments, the first terminal of the electronic circuit board of the water conservation apparatus is electrically connectable to a first rain sensor terminal of a non-networked irrigation controller; and the second terminal of the electronic circuit board of the water conservation apparatus is electrically connectable to a second rain sensor terminal of the non-networked irrigation controller. In certain embodiments, the first and second terminals of the water conservation apparatus are connected between a common control valve terminal and a common control valve return wire of the non-networked irrigation controller to selectively interrupt current flow from the common control valve return wire to the common control valve terminal. In certain embodiments, the electronic circuit board further includes a third terminal and a fourth terminal. The third and fourth terminals are connected to an auxiliary power source within the non-networked irrigation controller to provide power to the electronic circuit board.

Another aspect of the embodiments disclosed herein is a method for controlling a non-networked irrigation controller. The method comprises electrically interconnecting a water conservation apparatus to a first terminal and a second terminal within the irrigation controller. The method further comprises sending commands from a messaging server to the water conservation apparatus via a Wi-Fi router in radio frequency (RF) communication with the water conservation apparatus. The water conservation apparatus is responsive to a first command from the messaging server to selectively activate an electronic switch within the water conservation apparatus to close a current path between the first terminal and the second terminal within the irrigation controller. The water conservation apparatus is responsive to a second command from the messaging server to selectively deactivate the electronic switch within the water conservation apparatus to open the current path between the first terminal and the second terminal within the irrigation controller.

In certain embodiments, the first and second terminals within the irrigation controller are rain sensor terminals. In other embodiments, the first and second terminals within the irrigation controller are a common control valve terminal and a common control valve return wire. In such embodiments, the water conservation apparatus is operable to selectively interrupt current flow from the common control valve return wire to the common control valve terminal. In certain embodiments, the water conservation apparatus is programmable to selectively enable current flow between the first terminal and the second terminal only during a watering window.

Another aspect of the embodiments disclosed herein is a system for conserving water by controlling the operation of a non-networked irrigation controller to selectively override a watering schedule programmed in the irrigation controller. The system comprises a water conservation apparatus having at least a first terminal and a second terminal. The first terminal and the second terminal are electrically connectable to the non-networked irrigation controller. The water conservation apparatus selectively closes a current path between the first terminal and the second terminal to enable the irrigation controller to operate in accordance with the watering schedule programmed into the irrigation controller. The water conservation apparatus selectively opens the current path between the first terminal and the second terminal to disable the irrigation controller from operating in accordance with the watering schedule programmed into the irrigation controller. The water conservation device selectively closes and selectively opens the current path in accordance with commands received via Wi-Fi communications. The system further comprises a messaging server that receives and stores communication parameters to enable the messaging server to communicate with the water conservation apparatus. The messaging server further receives water conservation parameters. The messaging server is responsive to the water conservation parameters to generate and send commands to the water conservation apparatus to control the opening and closing of the current path. The system further comprises a smartphone or other computing device. The smartphone or other computing device executes an initialization process by which the smartphone or other computing device communicates with the water conservation apparatus by a local radio frequency communications protocol to set up the water conservation apparatus. The initialization process establishes the communication parameters to enable the messaging server to communicate with the water conservation apparatus via Wi-Fi communications. The smartphone or other computing device executes an operational process by which the smartphone or other computing device communicates with the messaging server to request the messaging server to modify the water conservation parameters and to cause the messaging server to send the water conservation parameters to the water conservation apparatus.

In certain embodiments, the messaging server receives information that identifies the location where the water conservation apparatus is installed; and the water conservation parameters include at least one parameter responsive to weather conditions at the location where the water conservation apparatus is installed. For example, the weather conditions may include at least one of:

current temperature at the location;
    accumulated rainfall at the location during a predetermined period before the current day and time; and
    predicted rainfall at the location for the current day.

In certain embodiments, the first and second terminals of the water conservation apparatus are connected to rainfall sensors of the non-networked irrigation controller. In other embodiments, the first and second terminals of the water conservation apparatus are connected between a common control valve terminal and a common control valve return wire of the non-networked irrigation controller.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

A water conservation method and apparatus are disclosed herein with respect to exemplary embodiments. The embodiments are disclosed for illustration of the system and are not limiting except as defined in the appended claims.

Figure 1:
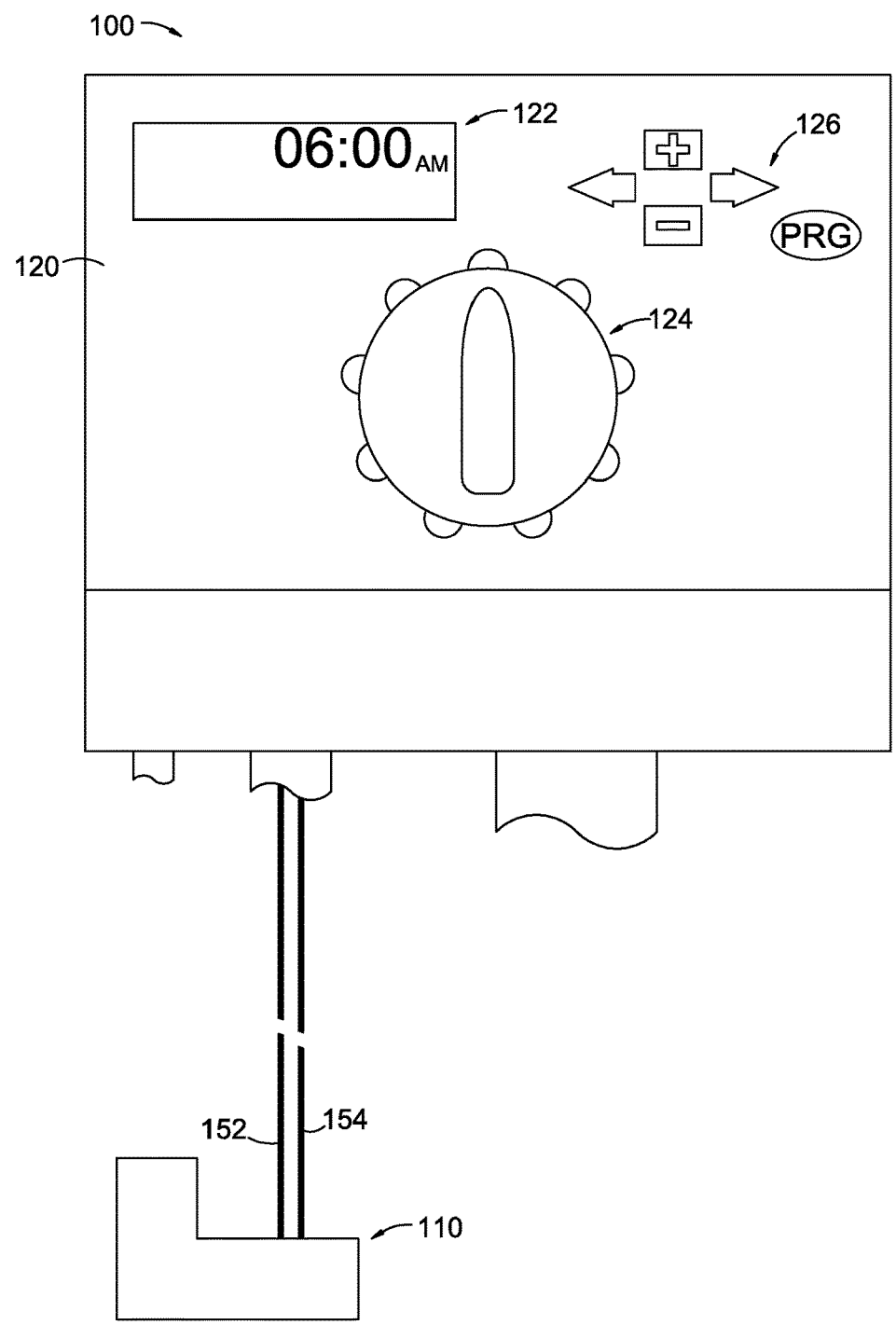
FIG. 1 illustrates a pictorial representation of a conventional, non-networked programmable irrigation controller connected to a conventional rain sensor.

FIG. 1 and illustrates a pictorial representation of a conventional, non-networked programmable irrigation controller 100 connected to a conventional rain sensor 110. In a typical installation, the irrigation controller is mounted indoors or outdoors at a location that is readily accessible by a user so that the irrigation controller can be programmed. For example, the irrigation controller may be mounted at eye level for a person of average height. For an outdoor installation, the irrigation controller includes a weathertight cover (not shown). The rain sensor is typically mounted in an area exposed to rain, such as, for example, a portion of a roof that is not shaded or other obstructed by trees or other items. The rain sensor may be located many feet away from the irrigation controller as indicated by the broken section in the wiring between the two apparatuses.

The irrigation controller 100 includes a control panel 120 having a display 122 (e.g., a liquid crystal display (LCD)) that displays various information (e.g., time of day, etc.) while the irrigation controller is operational. The display also displays information when the irrigation controller is being programmed (e.g., identification of an irrigation station being programmed, identification of days of week when irrigation is to occur, irrigation time durations, and the like). The illustrated irrigation controller includes a selector 124 that allows a user to select a function to be programmed, and includes a plurality of control switches 126 that allow a user to select irrigation stations, irrigation times, irrigation programs, and the like. The programming and operation of irrigation controllers are presented in detail in owner's manuals that are provided with the irrigation controllers and are beyond the scope of the present disclosure.

Figure 2:
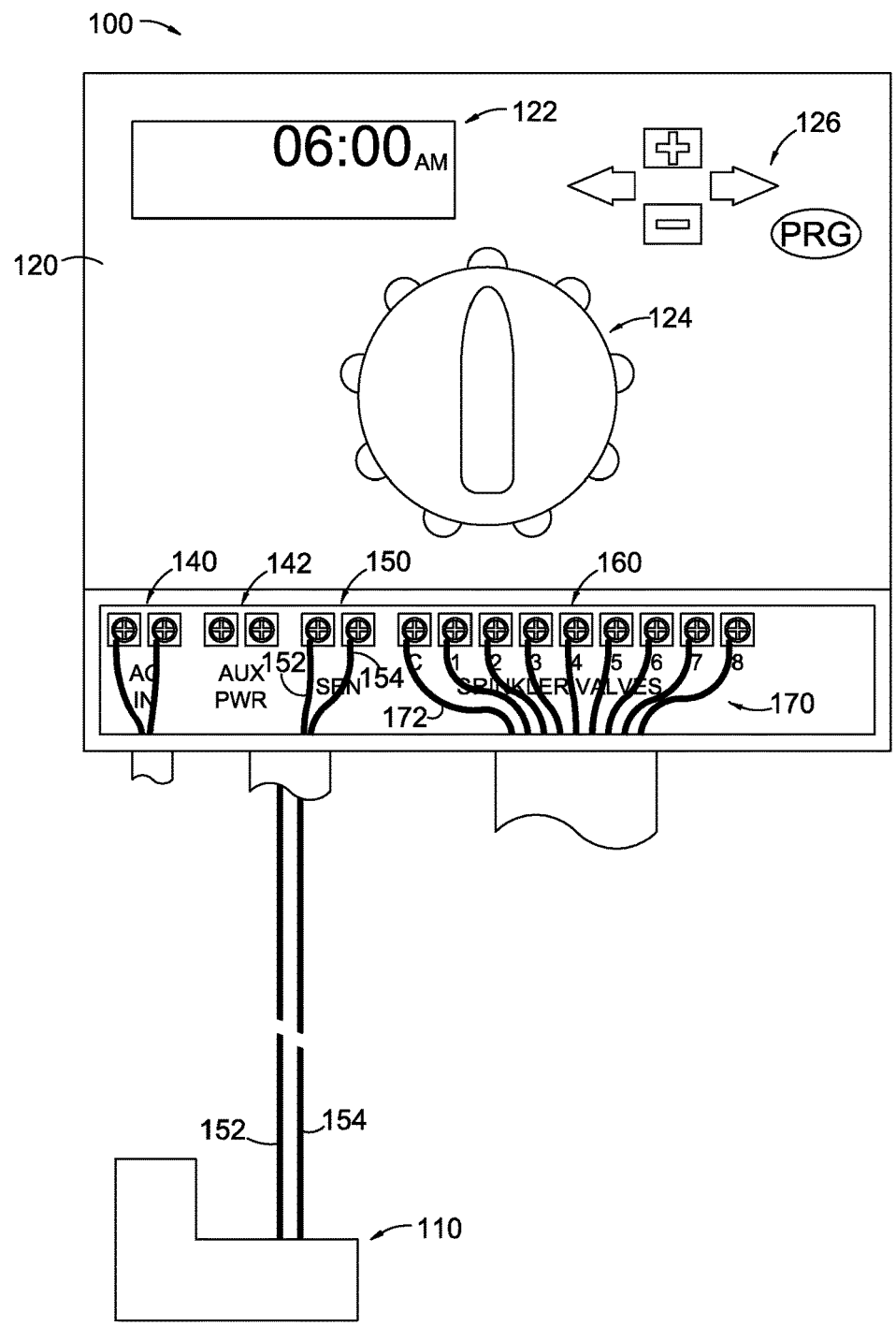
FIG. 2 illustrates the programmable irrigation controller of FIG. 1 with the lower portion of the panel of the irrigation controller removed to show a typical wiring configuration.

FIG. 2 illustrates the irrigation controller 100 of FIG. 1 with the lower portion of the control panel 120 of the irrigation controller removed to show a typical wiring configuration. As illustrated, the irrigation controller receives AC power via a first pair of terminals 140. In certain irrigation controllers, power may be provided from a wall adapter (not shown) or other source of low-voltage (e.g., 24 volts). In other irrigation controllers, power may be provided from a conventional interior or exterior wall outlet, and the controller may include a step-down transformer to reduce the AC voltage to an operational level (e.g., 24 volts). The illustrated irrigation controller provides auxiliary power (e.g., 24 volts) via a second pair of terminals 142. The auxiliary power terminals are not connected in FIG. 2. The irrigation controller includes a third pair of terminals 150, which operate as rain sensor terminals. As illustrated, the rain sensor terminals are connected to the rain sensor 110 via a first sensor wire 152 and a second sensor wire 154. A fourth set of terminals 160 provide connections to irrigation flow control valves (not shown) controlled by the irrigation controller. In many conventional irrigation controllers, a first terminal in the fourth set of terminals is a common terminal (labeled "C" in FIG. 2). Each of the other terminals in the fourth set of terminals has a respective number (e.g., "1," "2," . . . "8") corresponding to a particular flow control valve and thus corresponding to a set of sprinkler heads (not shown) coupled to the flow control valve. The terminals are connected to the flow control valves by a plurality of wires 170 in a wiring bundle. The wires in the bundle are usually color-coded to enable the wires to be identified at each flow control valve. The conventional irrigation controller selectively provides a current to only one of the numbered terminals at any particular time to activate one flow control valve. The flow control valves are all connected to a common return line 172 that allows current to return from the activated flow control valve to the common terminal "C."

The rain sensor 110 may operate in a known manner to selectively provide an electrically conductive path between the two rain sensor terminals 150 of the irrigation controller 100. If no rain has accumulated or if an insufficient quantity of rain has accumulated, the rain sensor operates as a closed switch between the two terminals such that current flows between the two terminals. When current is flowing between the two rain sensor terminals, the irrigation controller is active and controls the voltages applied to the numbered terminals in the fourth set of terminals 160. When a sufficient quantity of rain has accumulated, the rain sensor operates as an open switch to prevent current from flowing between the two terminals. The irrigation controller is inactive when no current is flowing between the two terminals and does not provide a voltage to any of the numbered terminals. Many irrigation controllers include a rain sensor override switch (not shown), which may be closed to interconnect the two sensor terminals internally to the controller. For example, the rain sensor override switch may be closed if no rain sensor is present or if it appears that a connected rain sensor is malfunctioning and is staying open even when no rain has accumulated.

As discussed above, the rain sensor 110 is often useful when rain has accumulated during an interval before the onset of a scheduled irrigation cycle; however, if the rainfall starts shortly before or during the irrigation cycle, the irrigation controller will continue to maintain the programmed irrigation cycle until the rain accumulates to a sufficient quantity to open the switch within the rain sensor. The rain sensor is entirely ineffective in blocking a scheduled irrigation cycle that occurs in the morning when a heavy rainfall is predicted for the afternoon of the same day.

Figure 3:
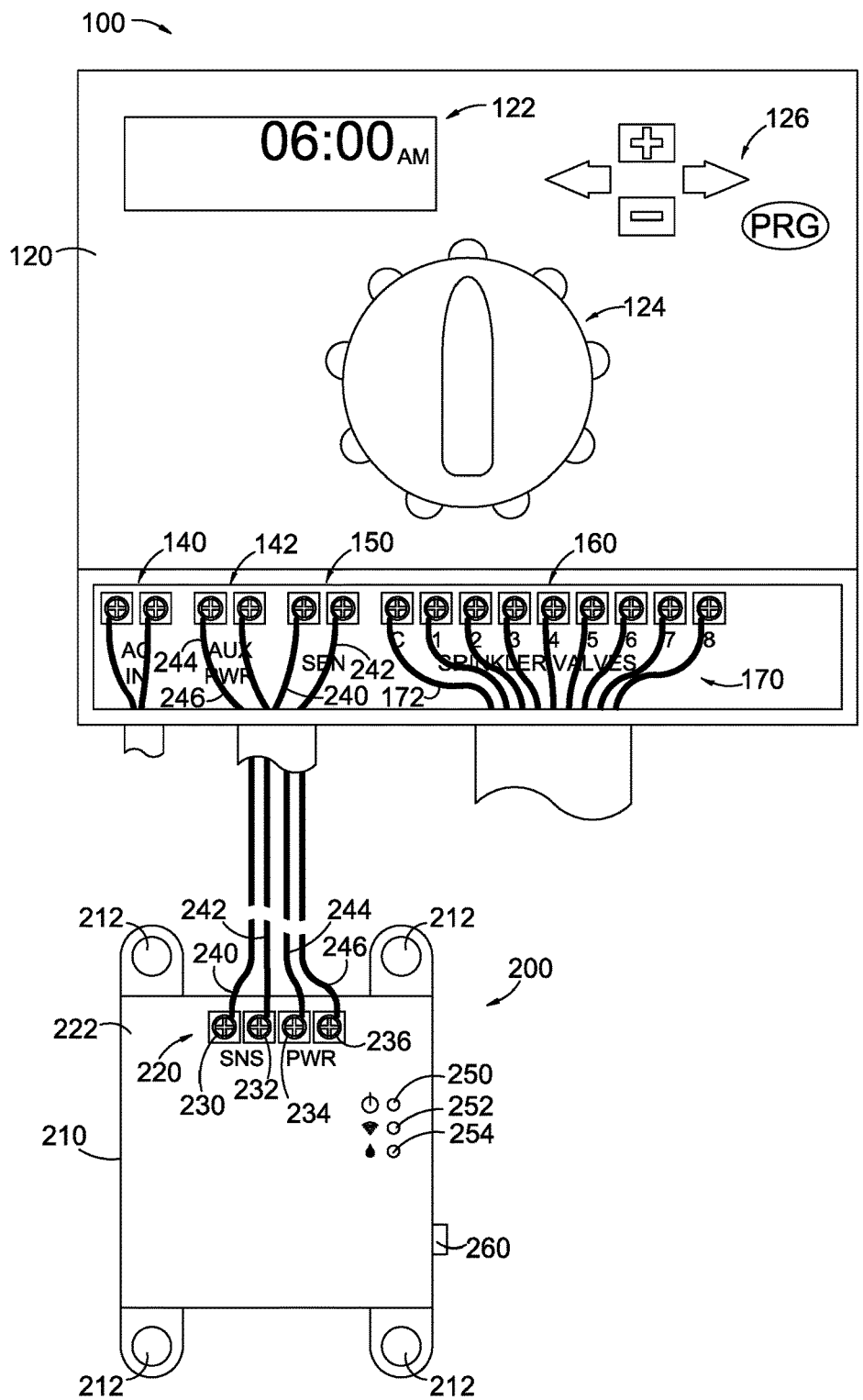
FIG. 3 illustrates a pictorial representation of the programmable irrigation controller of FIG. 1 with the conventional rain sensor removed and with the water conservation apparatus disclosed herein connected to the programmable irrigation controller in place of the conventional rain sensor.

FIG. 3 illustrates a pictorial representation of the irrigation controller 100 of FIGS. 1 and 2 with the conventional rain sensor removed. A water conservation apparatus 200 is connected to the programmable irrigation controller in place of the conventional rain sensor. The conservation apparatus comprises an enclosure 210 having a plurality (e.g., 4) of mounting holes 212 that enable the enclosure to be mounted on a wall or other flat surface. In certain installations, the conservation apparatus can be mounted near the irrigation controller; however, the water conservation apparatus may also be mounted at a distance from the irrigation controller. For example, if the irrigation controller is weathertight and is mounted at an unprotected outdoor location, the conservation apparatus may be mounted indoors or at a protected outdoor location. The wiring (described below) can be made sufficiently long to interconnect the conservation apparatus and the irrigation controller over a distance of at least 50 feet.

As further illustrated in FIG. 3, the conservation apparatus 200 includes a terminal strip 220 that extends from an internal circuit board (not shown) through an exposed front wall 222 of the enclosure 210. The terminal strip includes a first terminal 230 and a second terminal 232 (labeled "SNS") and includes a third terminal 234 and a fourth terminal 234 (labeled "PWR"). The first and second terminals are connected via a first wire 240 and a second wire 242 to the third set of sensor terminals 150 in the sprinkler controller 100. The third and fourth terminals are connected via a third wire 244 and a fourth wire 244 to the second set of auxiliary power terminals 142 in the sprinkler controller. In the illustrated embodiment, the currents communicated by the wires are AC currents. Accordingly, the first and second wires are interchangeable, and the third and fourth wires are interchangeable.

The exposed front wall 222 of the enclosure 210 further supports a first visual display device 250, a second visual display device 252 and a third visual display device 254. As described below, the three display devices are selectively activated by the conservation apparatus 200 to provide a visual indication of the status of the operation of the conservation apparatus. In the illustrated embodiment, the first display device comprises a light-emitting diode (LED) that is activated to emit green light when the conservation apparatus is turned on. The second display device comprises a dual LED having a common display area. As described below, the second display device is selectively activated to alternately emit green light and red light when the conservation apparatus is in a Wi-Fi enabled mode of operation. The third display device comprises an LED that is selectively activated to emit green light when the conservation apparatus is enabling water flow. The third display device is inactive when the conservation apparatus in a water conservation mode of operation wherein the conservation device is blocking the irrigation controller 100 from enabling the flow control valves.

In the illustrated conservation apparatus 200, an actuator 260 extends from the right side of the enclosure 210. The actuator is coupled to an internal manual switch (described below). The actuator is manually engageable by a user to operate the internal manual switch to turn the conservation apparatus off in a first switch position and to turn the conservation apparatus on in second switch position. The actuator is further engageable by a user to operate the internal manual switch to third switch position to initiate the water conservation apparatus. The third switch position is a momentary position. When a user releases pressure on the actuator when the internal manual switch is in the third switch position, a resilient member within the internal manual switch automatically returns the internal manual switch to the second ("on") switch position.

As described in more detail below, the conservation apparatus 200 receives power from the auxiliary power terminals 142 of the irrigation controller 100 via the third wire 244 and the fourth wire 246. The conservation apparatus selectively opens and closes an internal solid-state relay (not shown in FIG. 3) to selectively interconnect the first wire 240 and the second wire 242 to the sensor terminals 150 of the irrigation controller. When the relay is closed, the sensor terminals are interconnected so that current flows between the two terminals, and the irrigation controller is fully operational to provide current to the flow control valve terminals 160 in accordance with the currently programmed irrigation schedule. When the relay is open, the sensor terminals are disconnected to preclude current flow between the terminals, and the irrigation controller cannot provide current to the flow control valve terminals irrespective of the currently programmed irrigation schedule. The foregoing assumes that any sensor bypass switch (not shown) of the irrigation controller is not in the bypass position.

Figure 4:
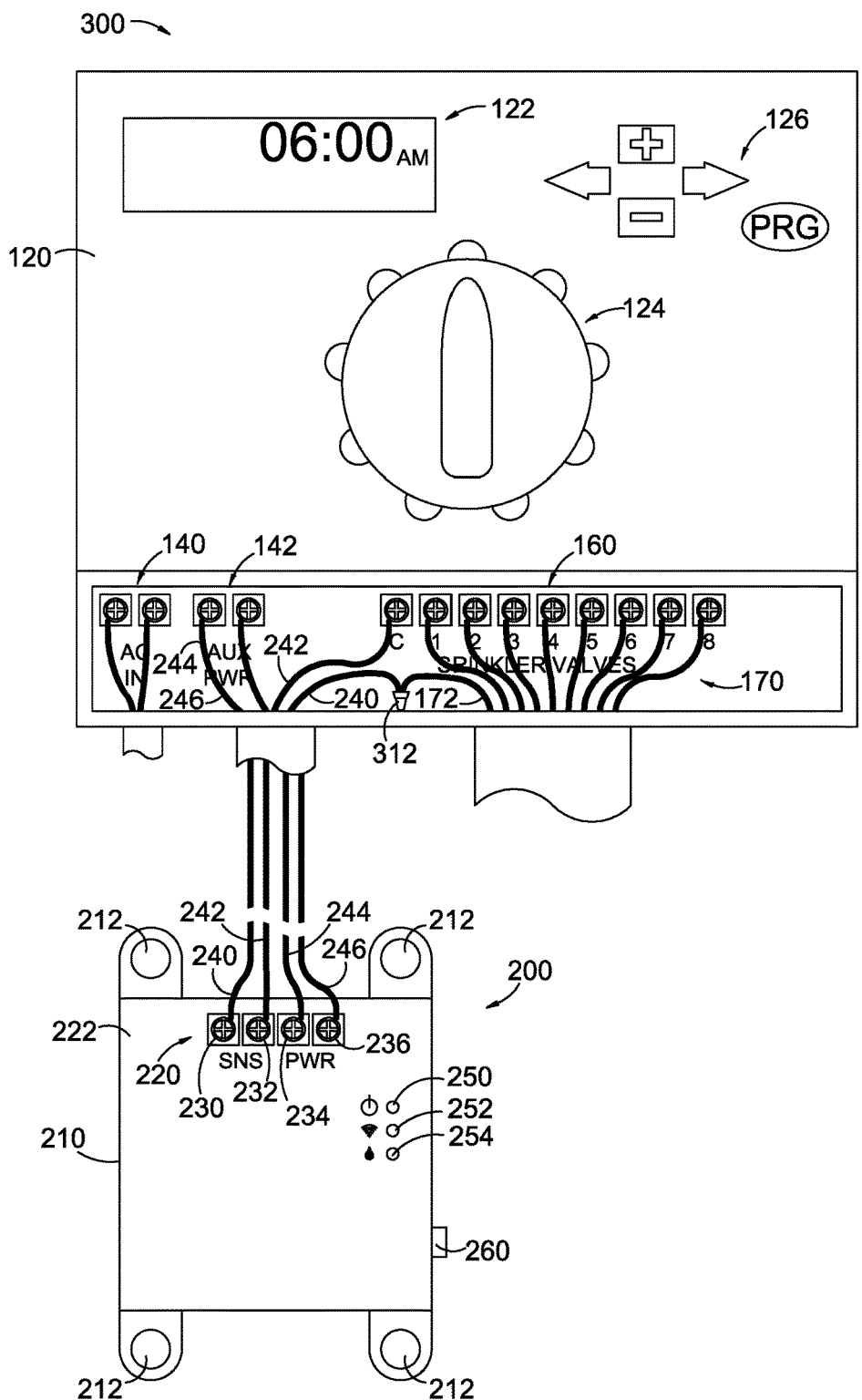
FIG. 4 illustrates a pictorial representation of a second conventional, non-networked programmable irrigation controller similar to the controller of FIG. 1 but with no provisional for connection of a conventional rain sensor, wherein the disclosed water conservation apparatus is connected in series with the common wire of the sprinkler valve wiring.

Although most irrigation controllers have a rain sensor function, some older models of irrigation controllers may not have a rain sensor function and thus may not have the sensor terminals 150 shown in FIG. 3. For example, FIG. 4 illustrates a pictorial representation of a second conventional programmable irrigation controller 300 similar to the irrigation controller 100 of FIGS. 1-3; however the second irrigation controller of FIG. 4 does not have sensor terminals for connection to a conventional rain sensor or to the conservation apparatus 200. In the embodiment of FIG. 4, power is provided to the conservation apparatus via the third wire 244 and the fourth wire 246 as described above. The first wire 240 from the conservation apparatus is connected to the common ("C") terminal of the flow control valve terminals 150. The second wire 242 from the conservation apparatus is connected to the common return wire 172 in the wire bundle 170 that would conventionally be connected to the common ("C") terminal. The connection is provided by a conventional twist-on wire connector 312 or other suitable wiring connector. Accordingly, the common return line in the cable bundle is selectively switched by the internal solid-state relay (not shown) within the conservation apparatus. Thus, although the irrigation controller 200 may be applying a voltage to one of the other terminals ("1," "2," . . . "8") during a schedule irrigation cycle, if the conservation apparatus opens the internal relay, no current can flow to any of the flow control valves, and no watering can occur.

If an embodiment of an irrigation controller does not have the auxiliary power terminals 142 shown in FIGS. 3 and 4, power can be provided to the conservation apparatus 200 by connecting the third wire 244 and the fourth wire 246 to the AC input ("AC IN") terminals 140 in parallel with the wires from the AC adapter (not shown).

Figure 5:
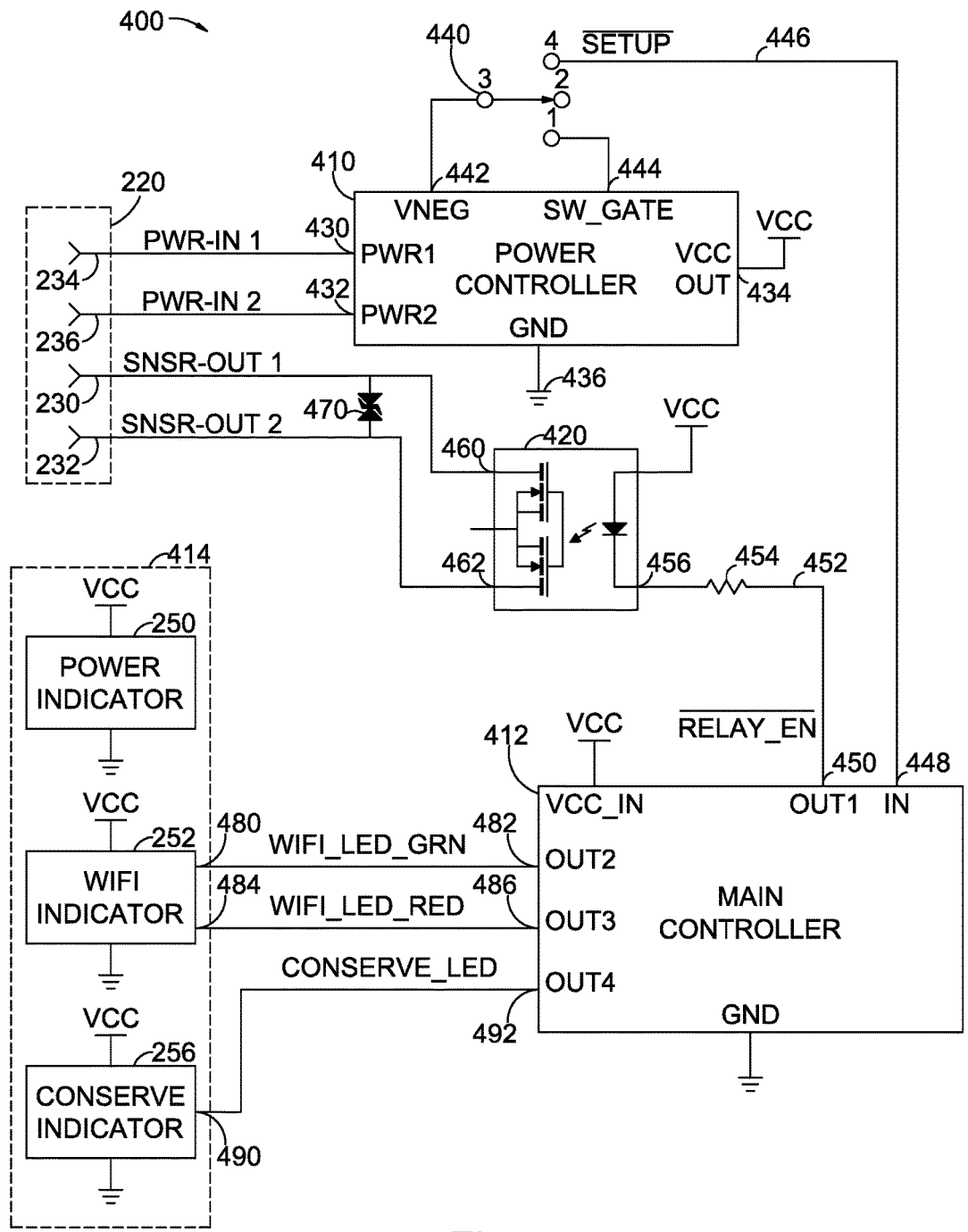
FIG. 5 illustrates a top level block diagram of the water conservation apparatus comprising a power controller, a main controller, a status display, a solid-state relay controlled by the main controller to control the conventional programmable irrigation controller of FIG. 3 or FIG. 4, and a three-position switch to select the operational mode of the water conservation apparatus.

FIG. 5 illustrates a top level block diagram 400 of an embodiment of the water conservation apparatus 200. The conservation apparatus comprises a power controller 410, a main controller 412 and a status display section 414. As described below, the status display comprises the first visual display device 250, the second visual display device 252 and the third visual display device 254 shown in FIGS. 3 and 4. A solid-state relay 420 is coupled to the sensor terminals 230, 232. The solid-state relay is controlled by the main controller to control the conventional programmable irrigation controller 100 of FIG. 3 or to control the alternative conventional irrigation controller 300 of FIG. 4.

The power controller 410 receives AC power from the third terminal 234 and the fourth terminal 236 of the terminal strip 220 via a first terminal (PWR1) 430 and a second terminal (PWR2) 432, respectively. When the power controller is enabled, as described below, the power controller generates a regulated DC output voltage ("VCC") on a VCC OUT terminal 434. The DC output voltage is referenced to a ground "("GND") reference 436. The output voltage and the ground reference are coupled to the other components of the conservation apparatus 200 as shown in FIG. 5. In the illustrated embodiment, the DC output voltage (VCC) generated by the power controller has a magnitude of approximately 3.3 volts.

As further shown in FIG. 5, a three-position manual switch 440 is electrically coupled to the power controller 410 and to the main controller 412. The manual switch is mechanically coupled to the actuator 260 shown in FIGS. 3 and 4. The manual switch is operable to select the operational mode of the water conservation apparatus. In the illustrated embodiment, the manual switch has four terminals identified as "1,", "2," "3" and "4." The terminal "3" is a common terminal and is selectively coupled to one of the other three terminals in accordance with the position of the manual switch selected by engaging the actuator. The common terminal "3" is electrically connected to a VNEG output terminal 442 of the power controller. The terminal "1" is electrically connected to an SW_GATE input terminal 444 of the power controller. The terminal "2" is not electrically connected to any other component. The terminal "4" is connected to a setup ($\overline{\text{SETUP}}$) line 446, which is coupled to an input ("IN") terminal 448 of the main controller.

As described in more detail below, when the manual switch 440 is actuated to a first position to connect the common terminal "3" to the terminal "1," the VNEG output terminal 442 of the power controller 410 is electrically connected to the SW_GATE input terminal 444 of the power controller, which causes the power controller to discontinue generating the VCC output voltage. The first switch position is a static position such that when the manual switch is manually actuated to the first switch position, the manual switch remains in the first switch position until manually moved to a different switch position.

When the manual switch 440 is actuated to a second position to connect the common terminal "3" to the terminal "2," the VNEG output terminal 442 of the power controller 410 is no longer connected to the SW_GATE input terminal 444 of the power controller. As described below with respect to FIG. 6, the power controller is responsive to this condition to generate the VCC output voltage. The second switch position is also a static position such that when the manual switch is manually actuated to the second switch position, the manual switch remains in the second switch position until manually moved to a different switch position.

When the manual switch 440 is actuated to a third position to connect the common terminal "3" to the terminal "4," the power controller 410 continues to generate the VCC output voltage. When the manual switch is in the third position, the setup line 446 is electrically connected to the VNEG output terminal 442 of the power controller 410 to cause the active low $\overline{\text{SETUP}}$ signal on the setup line to assume the magnitude of the voltage on the VNEG output terminal. As described below, when the manual switch is actuated to either the second position or the third position, the VNEG output terminal of the power controller is electrically coupled to the ground reference 436 to cause the VNEG output terminal to be effectively grounded. Thus, when the manual switch is actuated to the in the third switch position, the setup line to the input (IN) terminal 448 of the main controller 412 is grounded. In the illustrated embodiment, the third switch position is a momentary contact position. When manual pressure is applied to the manual switch to move the manual switch to the third switch position, the switch movement is applied against an internal resilient member of the manual switch. When the manual pressure is released, the internal resilient member causes the manual switch to automatically revert to the second switch position described above and to thereby disconnect the setup line from the common terminal "3."

As illustrated the manual switch 440 is a single-pole, three throw (SP3T) slide switch. As discussed above, the first and second switch positions are static positions such that when the manual switch is actuated to either position, the manual switch remains in the respective position. As further discussed above, the third switch position is a momentary contact position such that the manual switch only remains in the third position while manual pressure is applied. The manual switch moves from the third switch position back to the second switch position when manual pressure is released. In the illustrated embodiment, the manual switch may be a JSM07011SAQNL SP3T sub-miniature surface mount slide switch, which is commercially available from C&K Components of Newton, Mass. Other slide switches may also be used. In alternative embodiments (not shown), a first switch may be used to control power and a second switch may be used to temporarily connect the setup line 446 to the VNEG output 442 of the power controller 410.

When the main controller 412 receives the active low $\overline{\text{SETUP}}$ signal on the input (IN) terminal 448 from the setup line 446, the main controller initiates a setup routine (described below) to connect the main controller to a wireless interface (e.g., a Wi-Fi interface). After the setup routine is completed, the main controller is responsive to communications from a user via an Internet server to selectively control the current flowing between the first rain sensor terminal 230 and the second rain sensor terminal 232 of the terminal block 220. The main controller selectively enables an active low relay enable ($\overline{\text{RELAY\_EN}}$) signal from a first output terminal (OUT1) 450 to a relay control line 452, which is applied through a current control resistor 454 to a control input 456 of the solid-state relay 420. The solid-state relay has a first relay output terminal 460 and a second relay output terminal 462, which are respectively connected to the first rain sensor terminal and to the second rain sensor terminal. In one illustrated embodiment, the solid-state relay comprises a VO1464AT solid-state relay commercially available from Vishay Semiconductors of Malvern, Pa. Similar solid-state relays or other circuits can be used. The illustrated relay has an on resistance ($R_{ON}$) between the two output terminals of no more than approximately 0.25 ohms when a sufficient current flows from the input terminal to activate an infrared LED within the relay. When connected as shown in FIG. 5, the active relay conducts current bi-directionally between the two output terminals and is thus able to control an AC current.

The solid-state relay 420 is responsive to the activation of the relay enable signal by the main controller 412 to electrically interconnect the first relay output terminal 460 and the second relay output terminal 462 to provide a low-resistance path between the first rain sensor terminal 230 and the second rain sensor terminal 232. When the path is closed, current flows between the two rain sensor terminals. The current flowing through the solid-state relay completes a path between the rain sensor input terminals 150 of the conventional irrigation controller 100 of FIG. 3. Alternatively, the current flowing through the relay completes the current path from the common wire 310 to the common terminal "C" of the second alternative irrigation controller 300 of FIG. 4. In either case, when the main controller in the conservation apparatus 200 switches the relay enable signal to an inactive high state, the solid-state relay is turned off such that no current flows through the relay and thus no current flows between the two sensor terminals of the irrigation controller of FIG. 3 or in the common line of the irrigation controller of FIG. 4. Accordingly, when the relay is closed (i.e., the relay enable ($\overline{\text{RELAY\_EN}}$) signal is active low), the respective irrigation controller of FIG. 3 or FIG. 4 is enabled to control the flow control valves in accordance with the programmed irrigation schedule. When the relay is open, the respective irrigation controller of FIG. 3 or FIG. 4 is disabled from activating the flow control valves regardless of the programmed irrigation schedule.

As further shown in FIG. 5, a transient voltage suppressor 470 is electrically connected between the first rain sensor terminal 230 and the second rain sensor terminal 232. The transient voltage suppressor operates in a conventional manner to prevent the voltage between the two rain sensor terminals from exceeding a magnitude that may be harmful to the electrical components of the conservation apparatus 200. For example, in the illustrated embodiment, the transient voltage suppressor clamps the voltage between the two terminals so that the voltage does not exceed a safe voltage. In the illustrated embodiment, the transient voltage suppressor comprises a commercially available SMBJ36CA transient voltage suppressor from Fairchild Semiconductor Corporation having a clamping voltage of approximately 58 volts.

As further shown in FIG. 5, each of the first display device (power indicator) 250, the second display device (Wi-Fi indicator) 252 and the third display device (conserve indicator) 254 in the status display section 414 is connected between the VCC voltage bus and the ground reference. In addition, the Wi-Fi indicator has a first input terminal 480 connected to a second output terminal (OUT2) 482 of the main controller 412. The Wi-Fi indicator has a second input terminal 484 connected to a third output terminal (OUT3) 486 of the main controller. The conserve indicator has an input terminal 490 connected to a fourth output terminal (OUT4) 492 of the main controller.

The power indicator 250 emits a green light when power is applied to the conservation apparatus and the manual switch 440 is either in the second switch position or the third switch position.

The main controller 412 selectively outputs an active high signal (WIFI_LED_GRN) on the second output terminal 482 to cause the Wi-Fi indicator 252 to emit green light. The main controller selectively outputs an active high signal (WIFI_LED_RED) on the third output terminal 484 to cause the Wi-Fi indicator to emit red light. The two active high signals are activated alternatively so that a common display window of the Wi-Fi indicator emits light that alternates between red and green at one-second intervals with respective 50 percent duty cycles. The main controller only outputs the active high signals to the Wi-Fi indicator to cause the Wi-Fi indicator to blink between green and red colors when the main controller is actively communicating with a Wi-Fi network as described below.

The main controller 412 selectively outputs an active high signal (CONSERVE) from the fourth output terminal 492 to activate the conserve indicator 254. The conserve indicator is activated to emit light when the conservation apparatus has interconnected the first rain sensor terminal 230 and the second rain sensor terminal 232 when the relay 440 is closed. Thus, the conserve indicator emits light to indicate when the respective irrigation controller 100 of FIG. 3 or irrigation controller 300 of FIG. 4 is enabled to activate the flow control valves.

Figure 6:
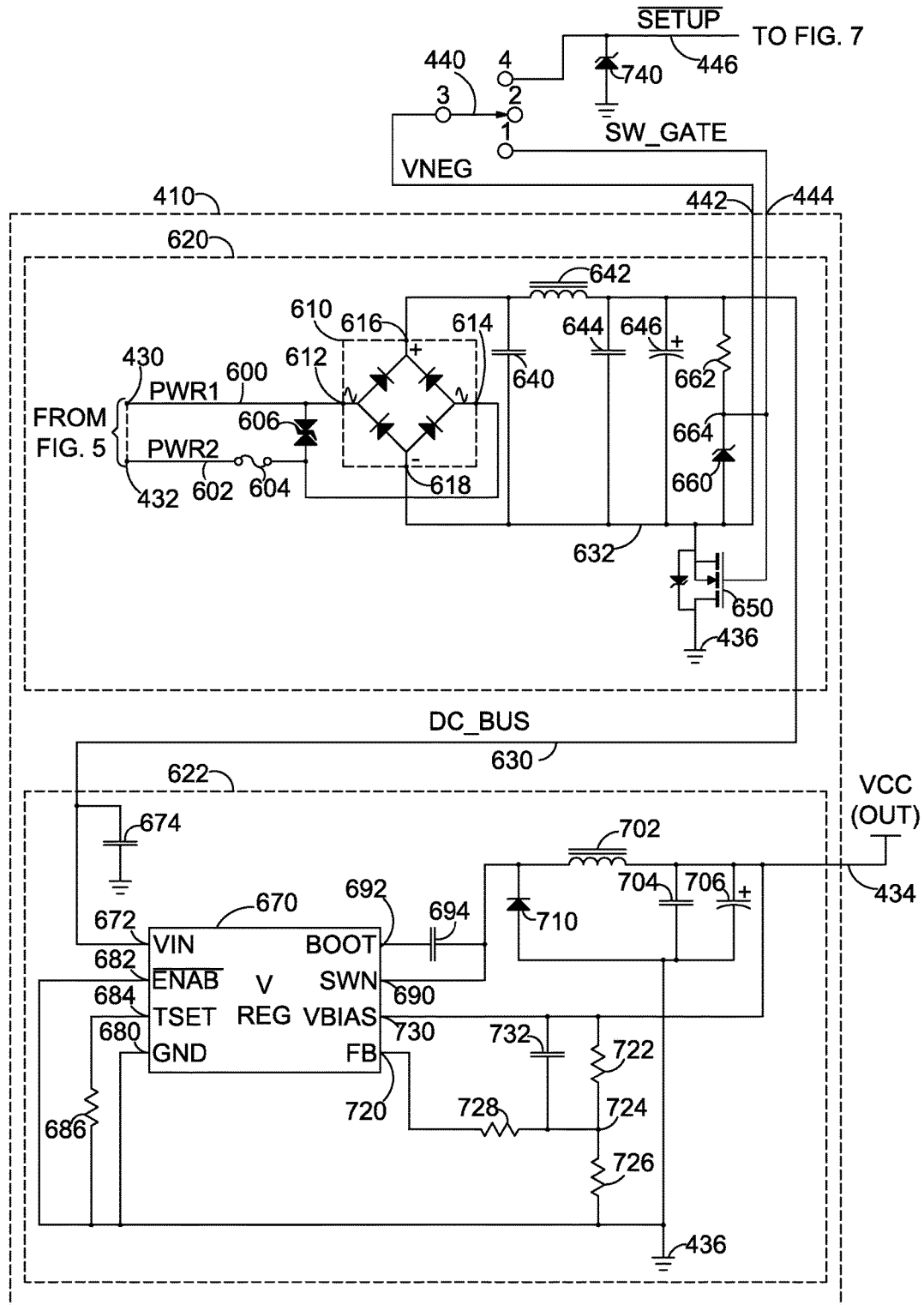
FIG. 6 illustrates a schematic diagram of the power controller of FIG. 5, the schematic diagram further illustrating the three-position manual switch of FIG. 5.

FIG. 6 illustrates a schematic diagram of the power controller 410 of FIG. 5. The manual switch 440 is also shown in FIG. 6 to further show the interconnections of the manual switch with the power controller. In the illustrated embodiment, the power controller receives AC input power via a first power input line 602 connected to the first power terminal (PWR1) 430 and a second power input line 604 connected to the second power terminal (PWR2) 432. One of the power input lines (e.g., the second power input line in FIG. 6) includes a fuse 604 that selectively interrupts current flow if the current flowing in the power input lines exceeds a safe magnitude. For example, in the illustrated embodiment, the fuse interrupts current flow if the current magnitude exceeds 1.5 amperes. In the illustrated embodiment, the fuse is a conventional surface mount fuse commercially available from Bel Fuse, Inc., of Jersey City, N.J., and from other sources.

In the illustrated embodiment, a transient voltage suppressor 606 is connected across the two power input lines 602, 604. The transient voltage suppressor of FIG. 6 is similar to or the same as the previously described transient voltage suppressor. The transient voltage suppressor operates in the manner described above to clamp the voltage across the first and second input terminals 430, 432 to a magnitude no greater than approximately 58 volts.

The first power input line 602 of the power controller 410 is connected to a first input terminal 612 of a full-wave bridge rectifier 610. The second power input line 604 is connected to a second input terminal 614 of the bridge rectifier. The bridge rectifier has a first (+) output terminal 616 and a second (−) output terminal 618. The bridge rectifier operates in a conventional manner to produce a rectified DC voltage across the first and second output terminals when an AC voltage is applied to the first and second input terminals. It should also be appreciated that the bridge rectifier will also produce a DC voltage across the first and second output terminals when a DC voltage is applied to the first and second input terminals, irrespective of the polarity of the applied DC voltage. Thus, the power controller will also operate with a DC voltage source (e.g., a battery or an AC-to-DC adapter) if the irrigation controller 100 (FIG. 3) or the irrigation controller 300 (FIG. 4) does not provide an AC voltage as an auxiliary power supply. A suitable full-wave bridge rectifier is an MB1S bridge rectifier commercially available from Fairchild Semiconductor Corporation.

The power controller 410 comprises a first voltage generation (filter) stage 620 and a second voltage generation stage 622. The first voltage generation (filter) stage receives the rectified DC voltage across the first and second output terminals 616 and 618 of the bridge rectifier 610 and produces a filtered DC voltage (DC_BUS) on a first stage output line 630. The voltage on the first stage output line is referenced to a VNEG bus 632, which is connected to the second (−) output terminal of the bridge rectifier. The VNEG bus is not connected directly to the ground reference 436 as will be explained below. The VNEG bus is connected to the VNEG output terminal 442, which is connected to the common terminal "3" of the manual switch 440.

The filter stage 620 reduces the AC ripple on the raw rectified DC voltage from the first (+) output terminal bridge rectifier. The filter stage comprises a first input capacitor 640 connected from the first (+) output terminal 616 of the bridge rectifier 610 to the VNEG bus 632. An inductor 642 has a first terminal connected to the first (+) output terminal of the bridge rectifier. A second terminal of the inductor is connected to the first stage output line 630. A second capacitor 644 is connected from the second terminal of the inductor to the VNEG bus. A third capacitor 646 is also connected from the second terminal of the inductor to the VNEG bus. Accordingly, the filtered DC voltage (DC_BUS) is developed across the second capacitor and the third capacitor. The filtered DC output voltage is referenced to the VNEG bus. In the illustrated example, the first and second capacitors have respective capacitances of approximately 4.7 microfarads, and the third capacitor has a capacitance of approximately 47 microfarads. The inductor has an inductance of approximately 100 microhenries.

The filtered DC voltage (DC_BUS) on the first stage output line 630 is unregulated, and the magnitude of the filtered DC voltage will vary in accordance with the magnitude of the auxiliary input voltage from the irrigation controller 100, from the irrigation controller 300 or from another voltage source. Accordingly, the filtered DC voltage from the first voltage generation stage 620 is provided as the input to the second voltage generation stage 622.

As discussed above, the VNEG bus 632 is not connected directly to the ground reference 436. Instead, the VNEG bus is isolated from the ground reference by a semiconductor switch 650, such as, for example, an IRLML0100 power metal oxide semiconductor field effect transistor (MOSFET) commercially available from International Rectifier of El Segundo, Calif., or a similar semiconductor switch from other sources. The source of the semiconductor switch is connected to the VNEG bus. The drain of the semiconductor switch is connected to the ground reference. The gate of the semiconductor switch is connected to the SW_GATE terminal 444 of the power controller 410. When no power is applied to the gate of the semiconductor switch, the switch is open, and the VNEG bus is effectively isolated from the ground reference by a high impedance with no more than 100 nanoamperes of current flowing through the switch. When a sufficiently high voltage is applied to the gate of the semiconductor switch with respect to the source, the semiconductor switch is turned on to provide a very low resistance (e.g., less than approximately 0.25 ohm) path from the drain to the source to effectively couple the VNEG bus to the ground reference.

The semiconductor switch 650 is turned on when the voltage on the SW_GATE terminal 444 is higher (e.g., approximately 3.9 volts higher in the illustrated embodiment) than the voltage on the VNEG bus 632. The maximum voltage on the SW_GATE terminal is limited by a Zener diode 660, which has an anode connected to the VNEG bus 632 and which has a cathode connected to first terminal of a source resistor 662 at a common node 664. A second terminal of the source resistor is connected to the first stage output (DC_BUS) line 630 to receive the filtered DC voltage. The SW_GATE terminal is connected to the common node of the Zener diode and the source resistor. In the illustrated embodiment, the Zener diode has a voltage of approximately 3.9 volts, and the source resistor has a resistance of 100,000 ohms. Accordingly, when current is flowing through the Zener diode, the voltage on the SW_GATE terminal and thereby on the gate of the semiconductor switch is sufficient to turn on the semiconductor switch and connect the VNEG bus to the ground reference 436. The current flows through the Zener diode when the manual switch 440 is in the second position or the third position because the SW_GATE terminal is not connected to any other line through the manual switch. When the manual switch is actuated to the first position to connect the common terminal "3" to the terminal "1," the SW_GATE terminal is connected to the VNEG bus, thus shorting across the Zener diode. The short across the Zener diode causes the gate-to-source voltage of the semiconductor switch to be zero volts, which causes the switch to develop a high-impedance (effectively open circuit) from the drain to the source to disconnect the VNEG bus from the ground reference. The effect of disconnecting the VNEG bus and the ground reference is discussed below.

The second stage 622 of the power controller 410 converts the unregulated DC voltage on the first stage output line 630 to a highly regulated DC voltage (VCC) on the output terminal 434. The second stage comprises a step down voltage regulator 670 that receives the unregulated voltage on an input (VIN) terminal 672. The input voltage is filtered by an input capacitor 674 having a capacitance of, for example, 100 nanofarads. In the illustrated embodiment, the voltage regulator comprises an A4447 high voltage step down regulator commercially available from Allegro Micro-Systems, LLC, of Worcester, Mass. Other voltage regulators from other manufacturers may also be used. The voltage regulator is configured as a buck power supply in a conventional manner with supporting components as shown in FIG. 6 to produce approximately 3.3 volts on the VCC output terminal. The operation of the voltage regulator is described in data sheets from the manufacturer and is briefly described below.

A ground input terminal 680 of the voltage regulator 670 is connected to ground reference 436. An active low enable ($\overline{\text{ENAB}}$) input terminal 682 of the voltage regulator is also connected to the ground reference. A TSET input terminal 684 of the voltage regulator is connected to the ground reference through an on-time setting resistor 686, which has a resistance of approximately 68,000 ohms in the illustrated embodiment.

A switched output terminal (SWN) 690 of the voltage regulator 670 is coupled to a BOOT input terminal 692 via a boot capacitor 694 having a value of approximately 100 nanofarads. The voltage regulator generates a pulse-width modulated (PWM) voltage on the switched output terminal that is provided to a first terminal of an inductor 702. A second terminal of the inductor is connected to respective first terminals of a first output capacitor 704 and a second output capacitor 706. The respective second terminals of the two output capacitors are connected to the ground reference 436. A diode 710 has an anode connected to the ground reference and has a cathode connected to the first terminal of the inductor. The VCC voltage on the VCC output terminal 434 is developed across the two output capacitors and is referenced to the ground reference. In the illustrated embodiment, the first output capacitor has a capacitance of approximately 100 nanofarads, and the second capacitor is an electrolytic capacitor having a capacitance of approximately 220 microfarads. When the voltage regulator operates, voltage pulses from the switched output terminal cause current to flow through the inductor to charge the output capacitors. The pulses have an on time and an off time. When the pulses are off, the diode provides a current path to enable the current built up in the inductor to continue to flow and continue to charge the output capacitors. The voltage regulator controls the on times and the off times in response to feedback from the VCC output voltage to maintain the VCC output voltage on the VCC output terminal at a selected voltage (e.g., 3.3 volts in the illustrated embodiment).

The feedback to the voltage regulator 670 is provided to a feedback (FB) input terminal 720 via a voltage divider circuit comprising a first resistor 722 having a first terminal connected to the VCC output bus 434 and having a second terminal connected to a feedback node 724. A second resistor 726 in the voltage divider circuit has a first terminal connected to the feedback node and has a second terminal connected to the ground reference 436. A feedback resistor 728 has a first terminal connected the feedback node and has second terminal connected to the feedback input terminal of the voltage regulator. In the illustrated embodiment, the first voltage divider resistor has a resistance of approximately 2,870 ohms and the second voltage divider resistor has a resistance of approximately 909 ohms such that when the VCC output voltage has a magnitude of approximately 3.3 volts the voltage on the feedback node has a magnitude of approximately 0.8 volts. An internal comparator within the voltage regulator compares the feedback voltage to an internal voltage reference of 0.8 volts to generate an internal error signal. The voltage regulator is responsive to the internal error signal to adjust the pulse-width modulated voltage applied to the inductor 702 to maintain the feedback voltage at 0.8 volts. The resistance of the feedback resistor does not affect the operation of the circuit. For example, the resistance may vary from 100 ohms to 10,000 ohms. In the illustrated embodiment, the VCC voltage from the VCC output bus is also provided to a BIAS input terminal 730. In the illustrated embodiment, the bias input terminal is coupled to the feedback node by a bias capacitor 732 having a capacitance of approximately 100 nanofarads.

As shown in FIG. 6, the unregulated DC voltage on the first stage output line 630 is provided to the VIN input terminal 672 of the voltage regulator 670. The VIN input terminal of the voltage regulator is referenced to the GND terminal 680, which is connected to the ground reference 436. When the semiconductor switch 650 in the first (filter) stage 620 is closed as described above, current can flow from the first stage to the voltage regulator in the second stage 622 and return to the VNEG bus 632 in the first stage via the semiconductor switch. However, when the semiconductor switch is open, no return current path to the first stage is provided. Accordingly, although an AC voltage or a DC voltage may be applied to the power input terminals 430, 432 of the voltage controller 410, when the semiconductor switch is open, the second stage of the voltage controller is inoperable and the VCC voltage is not generated.

As further shown in FIG. 6, the setup line 446 connected to the terminal "4" of the manual switch 440 is further connected to the cathode of a Zener diode 740, which has an anode connected to the ground reference 436. In the illustrated embodiment, the Zener diode is a 3.9-volt Zener diode. The Zener diode prevents the $\overline{\text{SETUP}}$ signal on the setup signal line from exceeding 3.9 volts. The setup line is grounded (e.g., connected to the ground reference 436) when the manual switch is actuated to the momentary contact position wherein the common terminal "3" is connected to the terminal "4."

Figure 7:
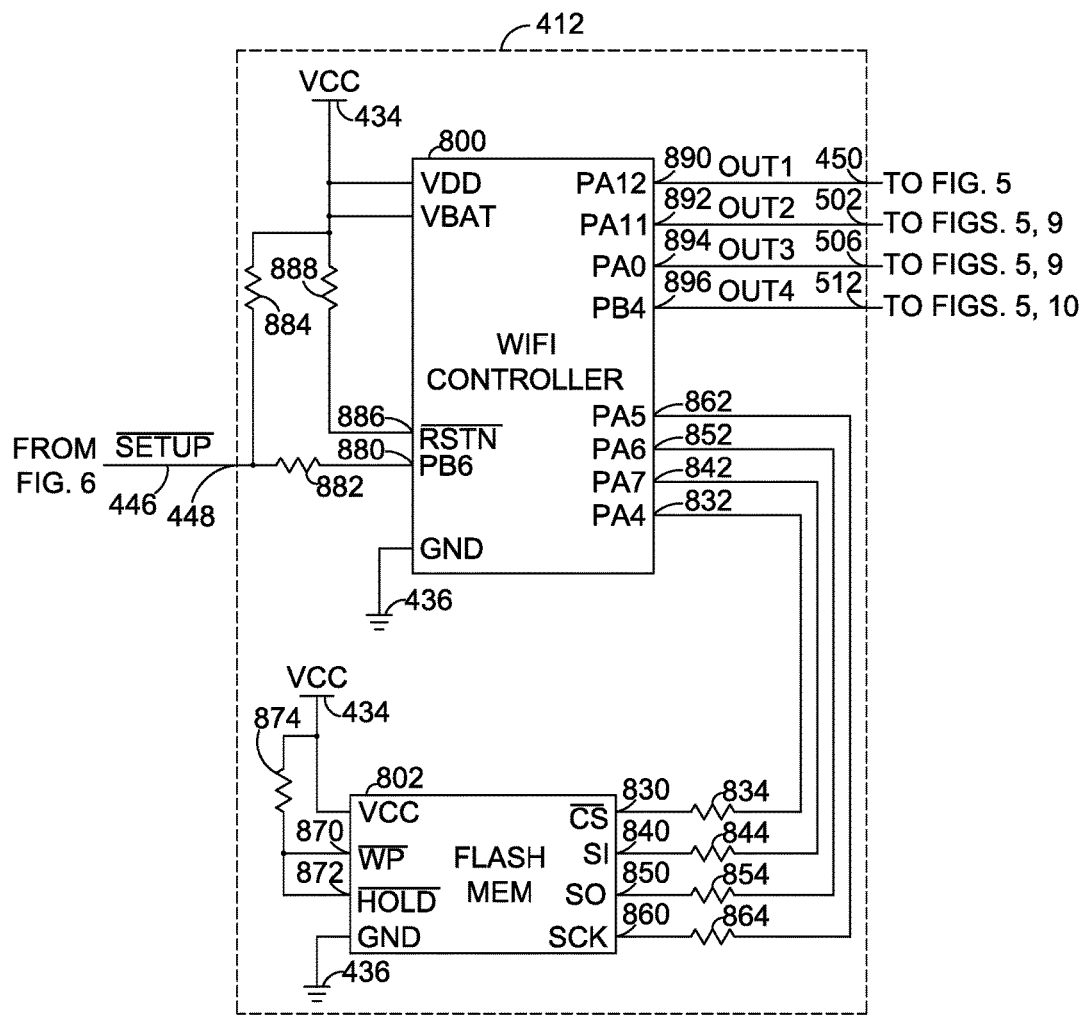
FIG. 7 illustrates a schematic diagram of the main controller of FIG. 5.

FIG. 7 illustrates a schematic diagram of the main controller 412 of FIG. 5. In the illustrated embodiment, the main controller comprises a Wi-Fi controller module 800 and a flash memory 802. The Wi-Fi controller module includes processing capability as well as Wi-Fi and Bluetooth connectivity. In the illustrated embodiment, the Wi-Fi module is implemented with an ISM43340 Embedded Serial-to-WiFi Module commercially available from Inventek Systems of Billerica, Mass.

Figure 11:
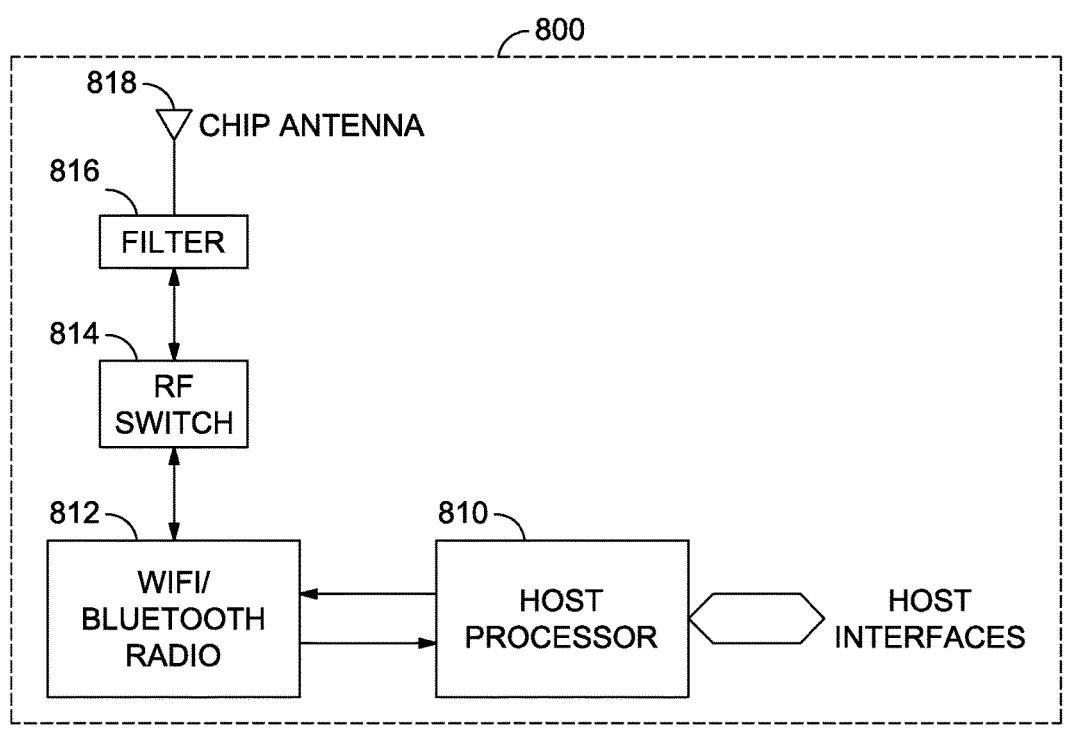
FIG. 11 illustrates a block diagram of the Wi-Fi controller module of FIG. 10.

A simplified block diagram of the Wi-Fi controller module 800 is illustrated in FIG. 11. Detailed information about the operation of the module is provided by the manufacturer in a published "ISM43349/1-M4G-L44 Product Specification (DOC-DS-20088-2.4.1), which is incorporated herein by reference. As shown in the block diagram, the Wi-Fi controller module includes a host processor 810, a radio device 812, a high frequency (RF) switch 814, a filter 816 and a chip antenna 818. As described by the manufacturer of the Wi-Fi controller module, the host processor comprises an ARM Cortex M4 microcontroller commercially available as an STM32F405 microcontroller from STMicroelectronics of Geneva, Switzerland. A datasheet for the microcontroller is available from the manufacturer, and is incorporated herein by reference. As further described by the manufacturer of the Wi-Fi controller module, the radio device comprises a BCM43340 single-chip, dual-band radio with integrated Bluetooth and Wi-Fi connectivity. The radio was developed by Broadcom of Irvine, Calif., and is commercially available from Cypress Semiconductor of San Jose, Calif. A datasheet for the radio is available from the manufacturer, and is incorporated herein by reference.

The flash memory 802 is a serial flash memory, which is commercially available from a many sources. For example, the flash memory may be an LE25S81A serial flash memory with 8 megabits of memory, which is commercially available from Semiconductor Components Industries, LLC, of Phoenix, Ariz., which does business as ON Semiconductor.

In the illustrated embodiment, a chip select ($\overline{CS}$) terminal 830 of the flash memory connected to a PA4 input/output terminal 832 of the Wi-Fi controller module via a series resistor 834. A serial input terminal (SI) 840 of the flash memory is connected to a PA7 input/output terminal 842 of the Wi-Fi controller module via a series resistor 844. A serial output (SO) terminal 850 of the flash memory is connected to a PA6 input/output terminal 852 of the Wi-Fi controller module via a series resistor 854. A serial clock (SCK) terminal 860 of the flash memory is connected to a PA5 input/output terminal 862 of the Wi-Fi controller module via a series resistor 864. A write protect ($\overline{WP}$) terminal 870 of the flash memory and a hold ($\overline{HOLD}$) terminal 872 of the flash memory are connected to the VCC voltage 434 via a pullup resistor 874 to disable the two active low inputs. The flash memory is used to store parameters to control the operation of the Wi-Fi controller during a setup routine described below.

As further shown in FIG. 7, the input terminal 448 of the main controller 412 receives the setup ($\overline{SETUP}$) signal on the setup line 446 from the manual switch 440 (FIGS. 4 and 5). The setup signal is coupled to a PB6 input/output terminal 880 of the Wi-Fi controller 800 via a series resistor 882. In one embodiment, the series resistor has a resistance of approximately 220 ohms. The PB6 input/output terminal is pulled up to the VCC voltage via a pullup resistor 884, which has a resistance of approximately 10,000 ohms. The pullup resistor causes the PB6 input/output terminal to be pulled to an inactive high voltage when the manual switch is not in the third position to connect the common terminal "3" to the terminal "4."

The Wi-Fi controller 800 has a reset in ($\overline{RSTN}$) terminal 886, which is pulled up to the VCC voltage 434 via a pullup resistor 888, which has a resistance of approximately 10,000 ohms. When power is initially applied to the Wi-Fi controller by actuating the manual switch 440 from the first switch position (the common terminal "3" connected to the terminal "1") to the second switch position (the common terminal "3" connected to the terminal "2"), the voltage on the reset input terminal switches from a low voltage to the VCC voltage. The Wi-Fi controller has internal reset circuitry that detects the transition and automatically resets the Wi-Fi controller when power is initially turned on. No external reset circuitry is required, and the pullup resistor assures that the reset in terminal is maintained at an inactive high status after the Wi-Fi controller is initially turned on.

Figure 9:
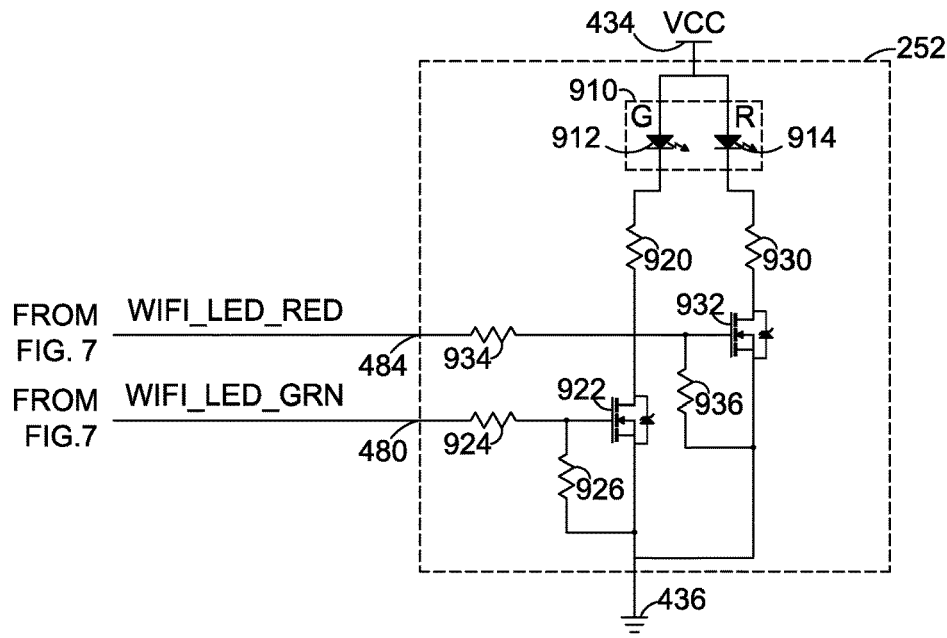
FIG. 9 illustrates a schematic diagram of the Wi-Fi active indicator.
Figure 10:
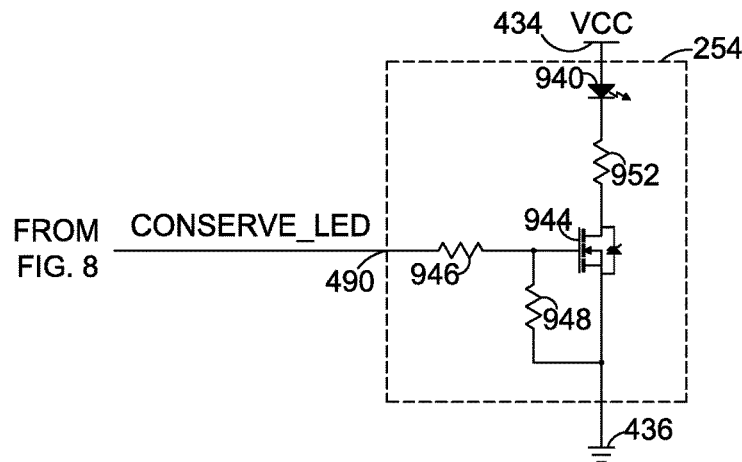
FIG. 10 illustrates a schematic diagram of the conservation indicator.

In the illustrated embodiment, the Wi-Fi controller 800 generates four output signals on four output terminals. The Wi-Fi controller controls a PA12 output terminal 890 connected to the OUT1 output terminal 450 of the main controller 412 to thereby generate the ($\overline{RELAY\_EN}$) signal that controls the relay 440 (FIG. 5). The Wi-Fi controller controls a PA11 output terminal 892 connected to the OUT2 output terminal 502 of the main controller 412 to thereby generate the WIFI_LED_GRN signal coupled to the Wi-Fi indicator 252 (FIGS. 5 and 9). The Wi-Fi controller controls a PA0 output terminal 894 connected to the OUT3 output terminal 506 of the main controller to thereby generate the WIFI_LED_RED signal coupled to the Wi-Fi indicator. The Wi-Fi controller controls a PB4 output terminal 896 connected to the OUT4 output terminal 512 of the main controller to thereby generate the CONSERVE signal coupled to the conserve indicator 510 (FIGS. 5 and 10).

Figure 8:
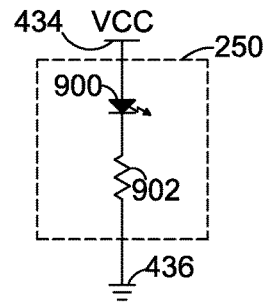
FIG. 8 illustrates a schematic diagram of the power indicator.

FIG. 8 illustrates a schematic diagram of the power indicator 250 of FIG. 5. The power indicator includes an LED 900 connected in series with a current limiting resistor 902 between the VCC voltage bus 434 and the ground reference 436. Accordingly, current flows through the LED whenever the VCC voltage bus is actively providing power. In the illustrated embodiment, the LED is an APTD3216CGCK SMD chip LED lamp commercially available from Kingbright Corporation of City of Industry, Calif.

FIG. 9 illustrates a schematic diagram of the Wi-Fi indicator 252 of FIG. 5. The Wi-Fi indicator includes a single chip dual-LED module 910 having a first (G) LED 912 that emits green light when active and having a second (R) LED 914 that emits red light when active. Each LED in the module has a respective anode terminal and a respective cathode terminal. The two anode terminals are connected together and connected to the VCC voltage bus 434. The cathode of the first (G) LED is connected to a first terminal of a first current limiting resistor 920. A second terminal of the first current limiting resistor is connected to the drain of a first MOSFET 922. The source of the first MOSFET is connected to the ground reference 436. The gate of the first MOSFET is connected via a first input resistor 924 to the first Wi-Fi indicator input terminal 480 and thus is connected to receive the WIFI_LED_GRN (OUT2) signal from the Wi-Fi controller 800 within the main controller 412. The gate of the first MOSFET is also connected to the ground reference via a first pull-down resistor 926. The cathode of the second (R) LED is connected to a first terminal of a second current limiting resistor 930. A second terminal of the second current limiting resistor is connected to the drain of a second MOSFET 932. The source of the second MOSFET is connected to the ground reference. The gate of the second MOSFET is connected via a second input resistor 934 to the second Wi-Fi indicator input terminal 484 and thus is connected to receive the WIFI_LED_RED (OUT3) signal from the Wi-Fi controller within the main controller. The gate of the second MOSFET is also connected to the ground reference via a second pull-down resistor 936. In the illustrated embodiment, the dual-LED module is an APBD3224ESGC-F01 SMD chip LED lamp commercially available from Kingbright Corporation. In the illustrated embodiment, the first and second MOSFETs are BSS138 N-Channel enhancement mode MOSFETs commercially available from Fairchild Semiconductor Corporation. In the illustrated embodiment, the first and second current limiting resistors have resistances of 68 ohms, and the first and second input resistors have resistances of 100 ohms.

When an active high WIFI_LED_GRN signal is applied to the first Wi-Fi indicator terminal 480, the first MOSFET 922 is turned on to enable current to flow through the first (G) LED to cause the dual-LED module to emit green light. When an active high WIFI_LED_RED signal is applied to the second Wi-Fi indicator terminal 484, the second MOSFET 932 is turned on to enable current to flow through the second (R) LED to cause the dual-LED module 910 to emit red light.

FIG. 10 illustrates a schematic diagram of the conserve indicator 256. The conserve indicator includes a conventional LED 940 that emits green light when active. The anode terminal of the LED is connected to the VCC voltage bus 434. The cathode of the LED is connected to a first terminal of a current limiting resistor 942. A second terminal of the current limiting resistor is connected to the drain of a MOSFET 944. The source of the MOSFET is connected to the ground reference 436. The gate of the MOSFET is connected via an input resistor 846 to the conserve indicator input terminal 490 and thus is connected to receive the CONSERVE (OUT4) signal from the Wi-Fi controller 800 within the main controller 412. The gate of the MOSFET is also connected to the ground reference via a pull-down resistor 948. In the illustrated embodiment, the LED is an APTD3216CGCK SMD chip LED lamp commercially available from Kingbright Corporation. In the illustrated embodiment, the MOSFET is a BSS138 N-Channel enhancement mode MOSFET commercially available from Fairchild Semiconductor Corporation. In the illustrated embodiment, the current limiting resistor has a resistance of 68 ohms, and the input resistor has a resistance of 100 ohms. When an active high signal is applied to the conserve indicator terminal, the MOSFET is turned on to enable current to flow through the LED to cause the LED to emit green light.

Figure 12:
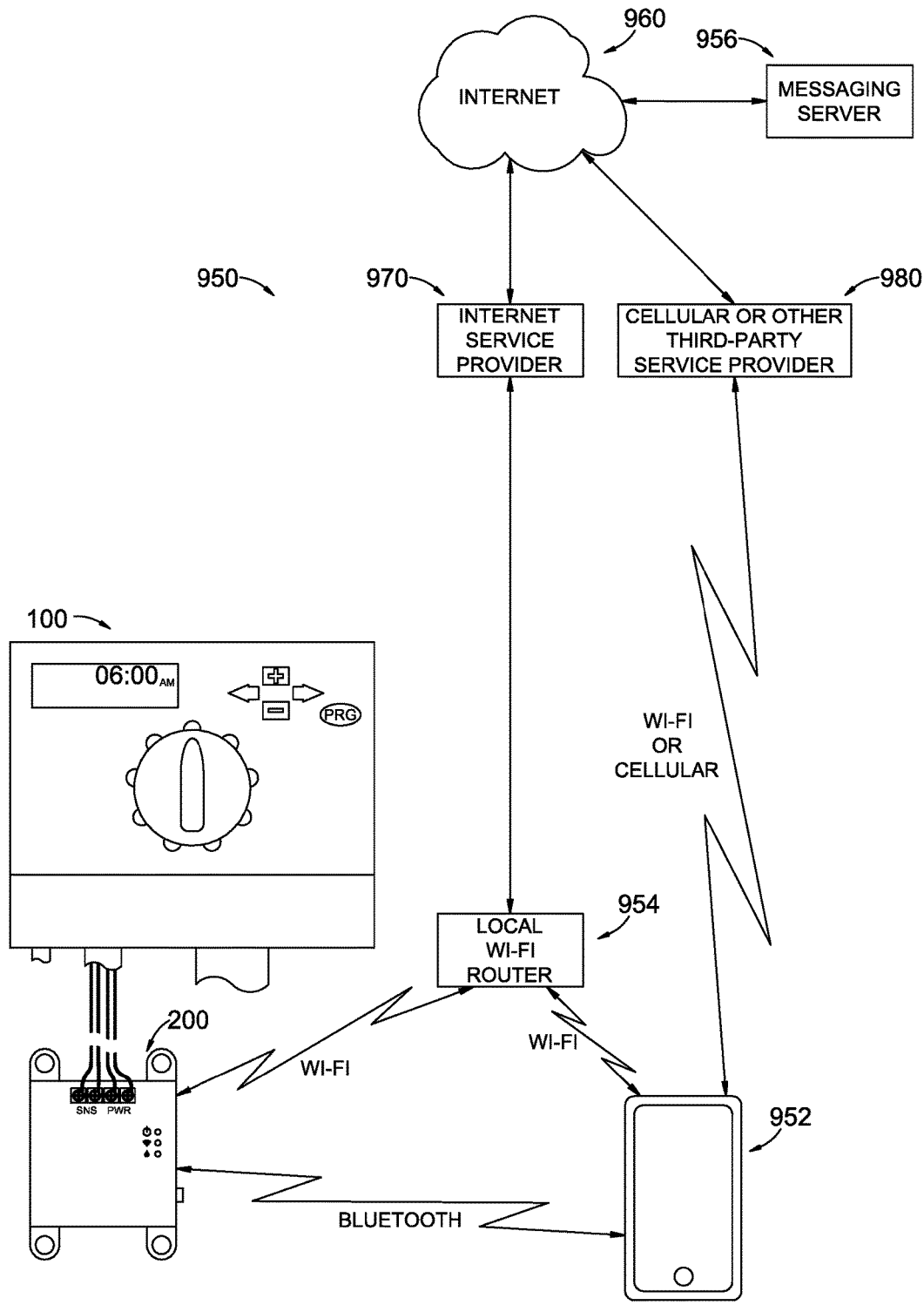
FIG. 12 illustrates a pictorial block diagram of a remote irrigation control system comprising the water conservation apparatus, a smartphone and a system provider server (messaging server), which are interconnected via radio frequency communications and the Internet.

FIG. 12 illustrates a pictorial block diagram of a remote irrigation control system 950 comprising the water conservation apparatus 200, a smartphone 952, a local Wi-Fi router 954, and a system provider server (messaging server) 956. As discussed above, the Wi-Fi controller module 800 within the conservation apparatus is able to communicate via the Bluetooth protocol and via the Wi-Fi protocol. Thus, the block diagram illustrates a Bluetooth connection from the conservation apparatus to the smartphone and a Wi-Fi connection from the conservation apparatus to the local Wi-Fi router. The smartphone is connected to the messaging server via the Internet 960. As illustrated, the smartphone may communicate with the Internet via the local Wi-Fi router and an Internet service provider (ISP) 970 to which the local Wi-Fi router is connected. The smartphone may also communicate with the Internet via a cellular service provider 980 or other third party provider. Thus, the smartphone may communicate with the messaging server when the smartphone is coupled to the same Wi-Fi network as the conservation apparatus and may also communicate with the messaging server when the smartphone is at a remote location. The water conservation apparatus controls the conventional, non-networked irrigation controller 100 (FIG. 3) in response to commands from the messaging server. As discussed above, the water conservation apparatus can also be connected to the conventional, non-networked controller 300 (FIG. 4).

As discussed below, the smartphone 952 initially communicates directly with a newly installed conservation apparatus 200 via the Bluetooth communications protocol. Using the Bluetooth communication, the smartphone sends instructions to the conservation apparatus to establish a Wi-Fi communications channel between the conservation apparatus and the local Wi-Fi router 954. The smartphone communicates with the messaging server 956 to send information to establish a new account with the messaging server. As part of the establishment of the new account, the smartphone identifies the specific conservation device (e.g., by media access control (MAC) address or other unique identifier) and provides location data for the conservation device. The identification information enables the messaging server and the conservation apparatus to communicate directly in the manner described below.

After the initial setup process, the smartphone 952 continues to communicate with the messaging server 956 to allow a user (not shown) to send watering scheduling requests to the messaging server. The messaging server processes the watering schedule requests and other information (described below) and sends to commands to conservation apparatus 200 via the communication channel.

Figure 13:
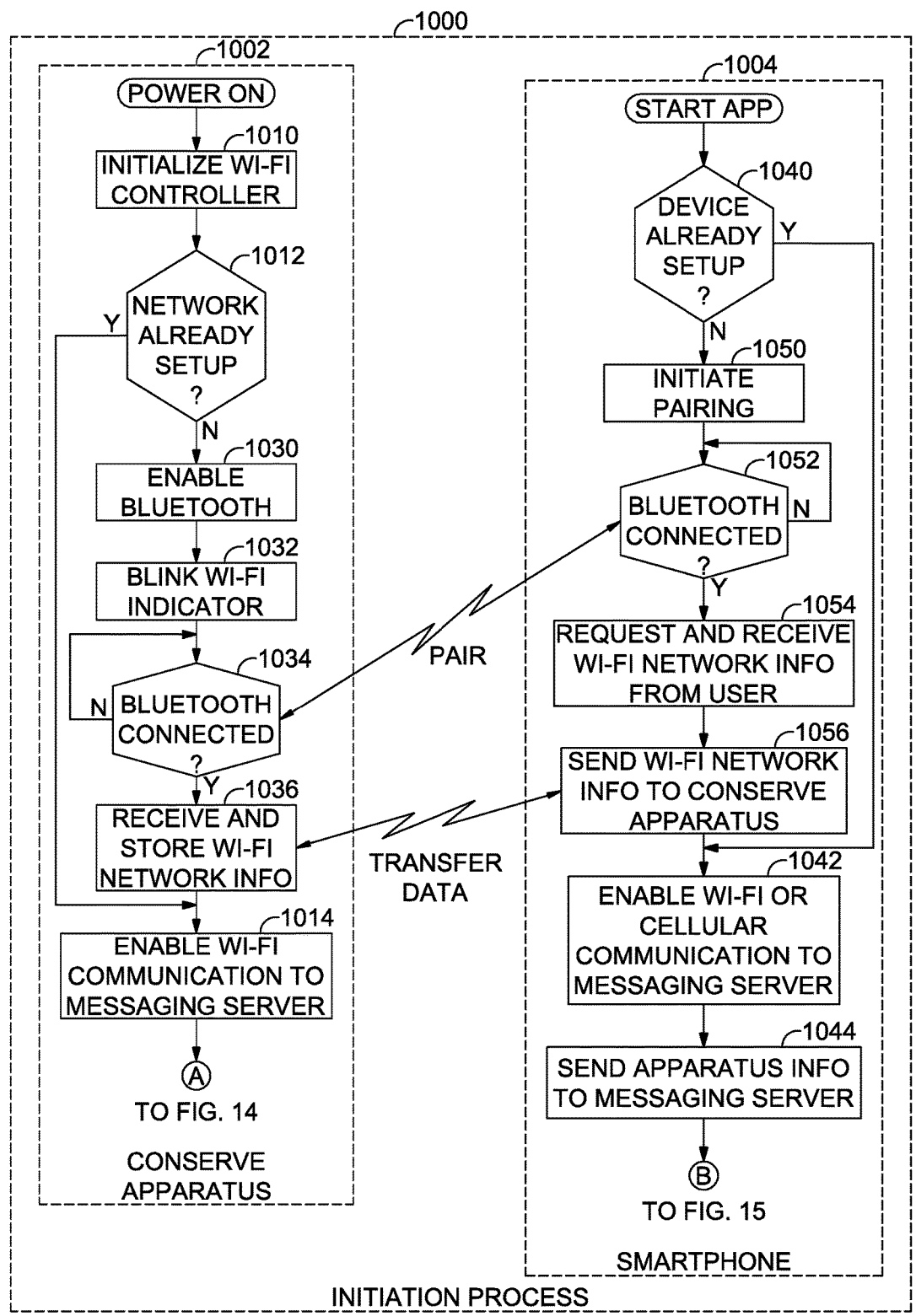
FIG. 13 illustrates a flow chart of the initiation process that sets up a newly installed water conservation apparatus using a smartphone.

FIG. 13 illustrates a flow chart of the initiation process 1000 that sets up a newly installed water conservation apparatus 200 using the smartphone 952. The conservation apparatus performs the actions shown in an initiation process 1002. The smartphone performs the actions shown in an initiation process 1004.

As shown in the process 1002, when power is turned on, the main controller 412 in the conservation apparatus 200 initializes in a process block 1010. If the network communications are already setup from a previous initial setup, the process advances from a decision block 1012 directly to a process block 1014 wherein the main controller enables Wi-Fi communications with the messaging server using the previously established parameters. The process then advances to an operation process 1020 in FIG. 14. On the other hand, if the network communications are not already set up, the process advances from the decision block 1012 to a process block 1030 wherein the process enables the Bluetooth protocol. Then, in a process block 1032, the process blinks the Wi-Fi indicator 252 (FIG. 3). The process then waits for a Bluetooth connection to be established with the smartphone 952 in a decision block 1034. When a Bluetooth connection is established, the process advances to a process block 1036 wherein the main controller receives and stores information from the smartphone to enable the main controller to establish a Wi-Fi connection with the local Wi-Fi router 954 (FIG. 12). The process then advances to the process block 1014 to establish the Wi-Fi connection. The process then advances to the conservation apparatus operation process 1020 in FIG. 14.

As further shown in FIG. 13, the smartphone 952 executes the corresponding initiation process 1004 in parallel with the initiation process 1002 executed by the conservation apparatus 200. When the initiation process is started, the smartphone determines, in a decision block 1040, whether the water conservation apparatus 200 is already set up. It the conservation apparatus is already set up, the smartphone process advances directly to a process block 1042 wherein the smartphone enables Internet communication with the messaging server 956 using either Wi-Fi communication or using cellular communications. In a process block 1044, the smartphone sends the Wi-Fi network information and device identification information to the messaging server to inform the messaging server to expect communications from the particular conservation apparatus associated with the application on the smartphone.

If the conservation apparatus 200 is not already set up in the smartphone 952, the smartphone process 1004 advances from the decision block 1040 to a process block 1050 wherein the smartphone process initiates a pairing protocol to establish Bluetooth communication with the conservation apparatus. Then, in a decision block 1052, the smartphone process waits for the Bluetooth communication to be established. When the Bluetooth communication is established, the smartphone process advances to a process block 1054 wherein the smartphone displays a set of images to a user to request user identification (e.g., name and email address) and to request the physical address location of the conservation address. The smartphone also requests the user to enter the network name and password of the local Wi-Fi router 954 (FIG. 12) to which the conservation apparatus is to be connected. After the information is received from the user, the smartphone process advances to a process block 1056 to transfer the network information (e.g., the network name and password) to the conservation apparatus using the previously established Bluetooth protocol. After the information is transferred to the conservation apparatus, the smartphone process advances to the process block 1042 and the process block 1044 wherein the smartphone establishes communication with the messaging server 956 and transfers the conservation apparatus information to the messaging server, as discussed above. After sending the conservation apparatus information to the messaging server in the process block 1044, the smartphone begins to execute routines to control the conservation apparatus via the messaging server. The control routines are represented by a flow chart of a smartphone server interface process 1060 in FIG. 15.

Figure 14:
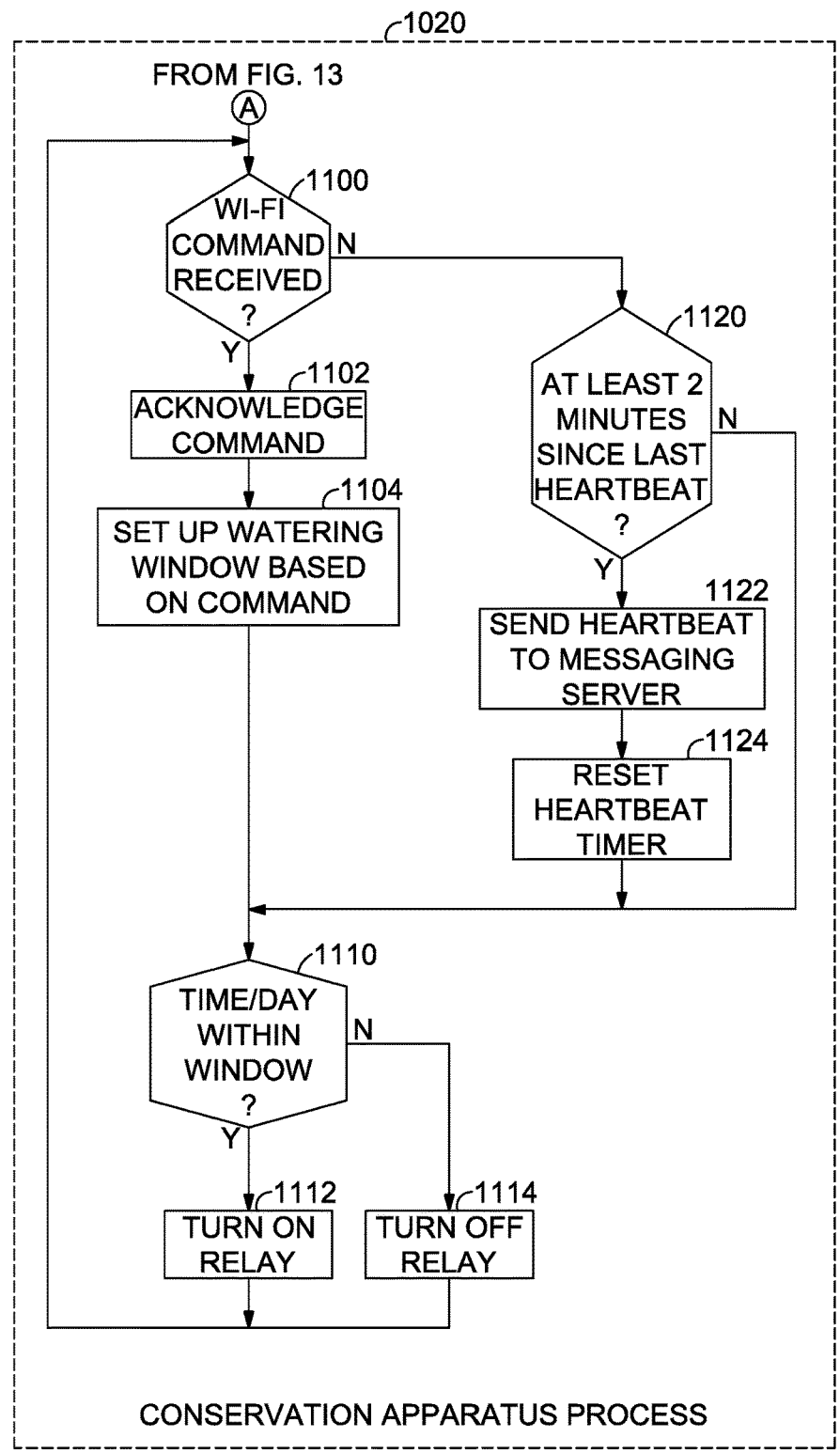
FIG. 14 illustrates a flow chart of the operation of the water conservation apparatus after initialization.

FIG. 14 illustrates the flow chart of the operation process 1020 the conservation apparatus 200 performs after completing the initialization process in FIG. 13. The operating process is a repeating loop. In a decision block 1100 the process checks to see if a new command has been received from the messaging server 956 via the Wi-Fi interface. If a new command has been received, the process inputs the command and acknowledges the command in a process block 1102. The process then sets a watering window based on the command received from the messaging server. The watering window can comprise a starting time and an ending time during which watering may occur. The messaging server may also send a command to the conservation apparatus to turn off watering irrespective of the currently stored watering window.

After responding to any new commands received from the messaging server, the operation process 1020 advances to a decision block 1110 wherein the process compares the current day and time of day to the limits of the currently saved watering window. If the current day and current time of day are within the limits of the currently saved watering window, the process advances to a process block 1112 and turns on the relay 420 (FIG. 5) to close the circuit path between the sensor terminals 230, 232 (FIG. 5) to enable the controller 100 (FIG. 3) or the controller 300 (FIG. 4) to water in accordance with the watering schedule programmed into the controller. If the current day and current time of day are not within the limits of the currently saved watering window, the process advances from the decision block 1110 to a process block 1114 and turns of the relay to disable watering. After turning on or turning off the relay, the process returns to the decision block 1100 and repeats the foregoing actions.

If, while in the decision block 1100, the process 1020 determines that no new commands from the messaging server 956 have been received, the process advances to a decision block 1120 wherein the process determines whether at least two minutes have elapsed since sending a communication to the messaging server. Communications to the messaging server are referred to herein as "heartbeats," which inform the messaging server that the conservation apparatus 200 is still powered on, is still connected to the Wi-Fi router 954 and is still executing the process 1020. If at least two minutes have elapsed since the last heartbeat was sent to the messaging server, the process advances to a process block 1122 wherein the process sends a heartbeat to the messaging server. The heartbeat includes information that identifies the conservation apparatus. By sending the periodic heartbeat, the conservation apparatus maintains an open communication channel with the messaging server. The heartbeat may include current Internet address information for the conservation apparatus in case the Internet address is a dynamic address that can be changed by the Internet service provider 970. After sending the heartbeat, the process resets the heartbeat timer in a process block 1124. In certain embodiments, the heartbeat timer may also be reset when the process acknowledges a command in the process block 1102. The process then advances to the decision block 1110 wherein the process determines whether the current day and time are within a watering window as described above. The process continues until power is lost or until the conservation apparatus is reset.

Figure 15:
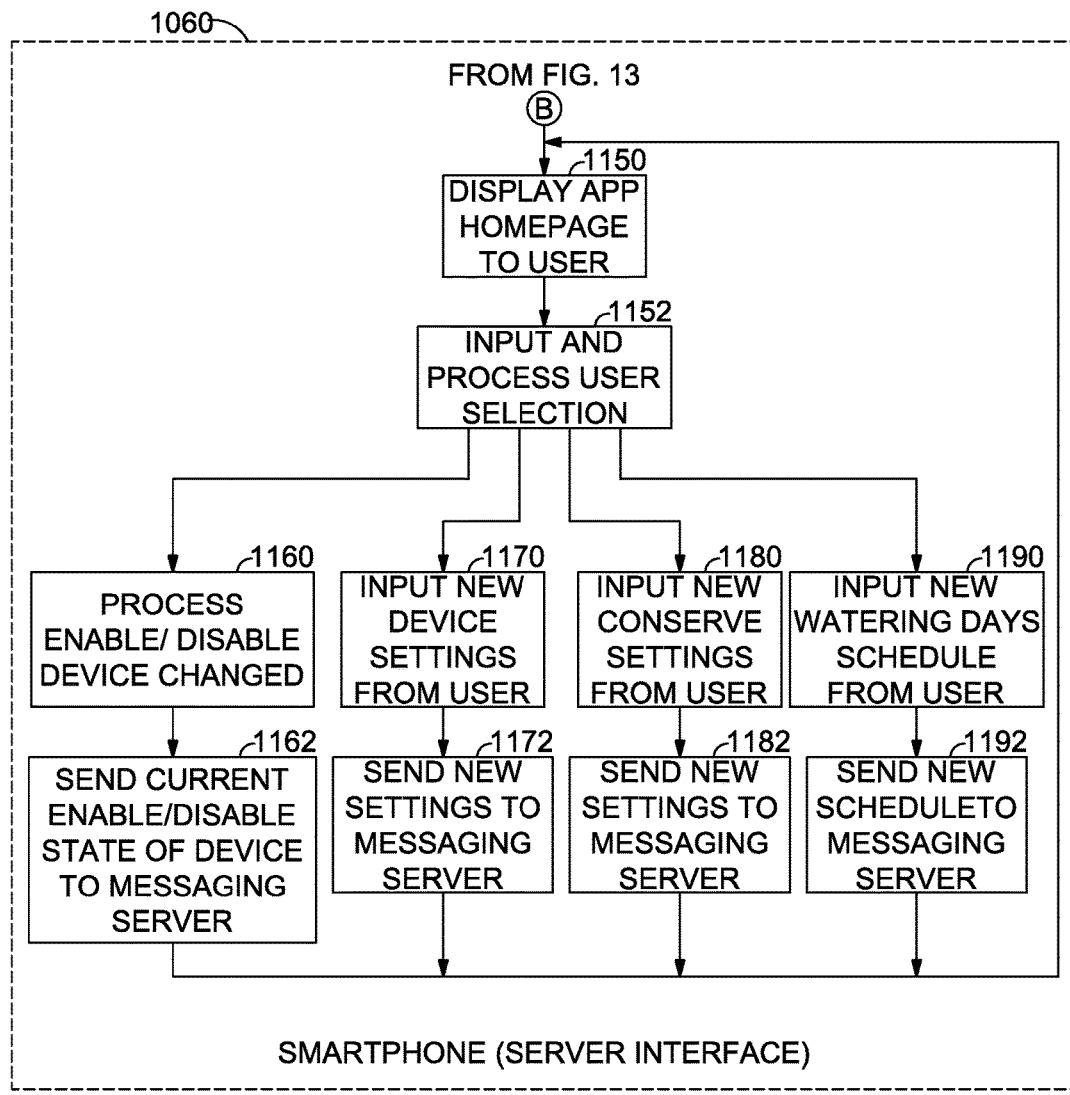
FIG. 15 illustrates a flow chart of the smartphone server interface process of the mobile application software (app) implemented on a smartphone or other computer system that enables the smartphone to communicate with the messaging server to control the operation of the conservation apparatus.

FIG. 15 illustrates a flow chart of the smartphone server interface process 1060 of the mobile application software (app) implemented on the smartphone 952 (or other computer system) that enables the smartphone to communicate with the messaging server 956 to control the operation of the conservation apparatus 200. When the process 1060 is enabled either immediately after initializing the conservation apparatus or at any time thereafter, the process displays an operational homepage to the user in a process block 1150. The homepage is displayed as a plurality of selections. When the user selects one of the sections, the process 1060 first determines which selection has been selected in a process block 1152. The process than branches to a selected process depending on the user selections.

If the user has changed the status of a two-position device enable/disable "switch" on the homepage, the process 1060 branches from the process block 1152 to a process block 1160 wherein the process processes the current state of the enable/disable switch. The process then advances to a process block 1162 wherein the smartphone 952 sends a communication to the messaging sever 956 to inform the messaging server of the change in the enable/disable switch. The response of the messaging server to the communication is described below with respect to FIG. 16. After sending the revised status of the enable/disable switch to the messaging server, the process returns to the process block 1150 to display the homepage and to allow the user to make a new selection.

If the process 1060 determines that the user has selected a menu item to implement device changes, the process advances from the process block 1152 to a process block 1170 wherein the process receives and saves device changes from the user. The process then advances to a process block 1172 wherein the smartphone 952 sends the changes to the messaging server 956. After sending the changes to the messaging server, the process returns to the process block 1150 to display the homepage and to allow the user to make a new selection.

If the process 1060 determines that the user has selected a menu item to modify the conservation settings, the process advances from the process block 1152 to a process block 1180 wherein the process receives and saves the conservation (conserve) settings. The conservation settings include criteria for watering on certain days based on historical rain accumulation, based on temperature, and based on predicted rainfall. In one embodiment, the selection of the conservation settings menu item causes the smartphone to display a page showing the current weather conditions at the saved location of the conservation apparatus 200. The current weather conditions may include, for example, the current temperature, the accumulated rainfall for the current day, the accumulated rainfall for the last two days and the accumulated rainfall for the last seven days, and a rainfall prediction for the next 24 hours. The smartphone displays a first sliding numeric scale that allows the user to select a temperature below which the conservation apparatus will not enable watering. The smartphone also displays a sliding scale that allows the user to select a rainfall prediction percentage for the next 24 hours above which the conservation apparatus will not enable watering. In the illustrated embodiment, the smartphone also displays a respective sliding scale that allows the user to select a respective rainfall accumulation for each previous period above which the water conservation apparatus will not enable watering. For example, one scale can be set to 0.25 inch for rainfall for the current day. A second scale can be set to 0.5 inch for rainfall accumulated over the last two days. A third scale can be set to 1.5 inches for rainfall accumulated over the last seven days. Each scale is independently adjustable to a user's preferences. After selections are made and the page is exited, the process sends the conservation settings to the messaging server 956 in a process block 1182. After sending the new conservation settings to the messaging server, the process returns to the process block 1160 to display the homepage and to allow the user to make a new selection.

If the process 1060 determines the user has selected a watering schedule menu item, the process advances from the process block 1152 to a process block 1190 to display seven buttons labeled with the days of the week. The user is able to toggle each button from a respective active (watering enabled) state to a respective inactive (watering disabled) state. For example, the user may select to not water on weekend days when outside activities are more likely to occur or to not water on a day when lawn maintenance is scheduled. After the watering day selections are made and the page is exited, the process sends the watering schedule settings to the messaging server 956 in a process block 1192. After sending the watering schedule settings to the messaging server, the process returns to the process block 1160 to display the homepage and to allow the user to make a new selection.

Although not shown, it should be understood that the process 1060 can be exited after the user has made one or more selections by closing the application. The process can also be exited without the user making any new selections.

Figure 16:
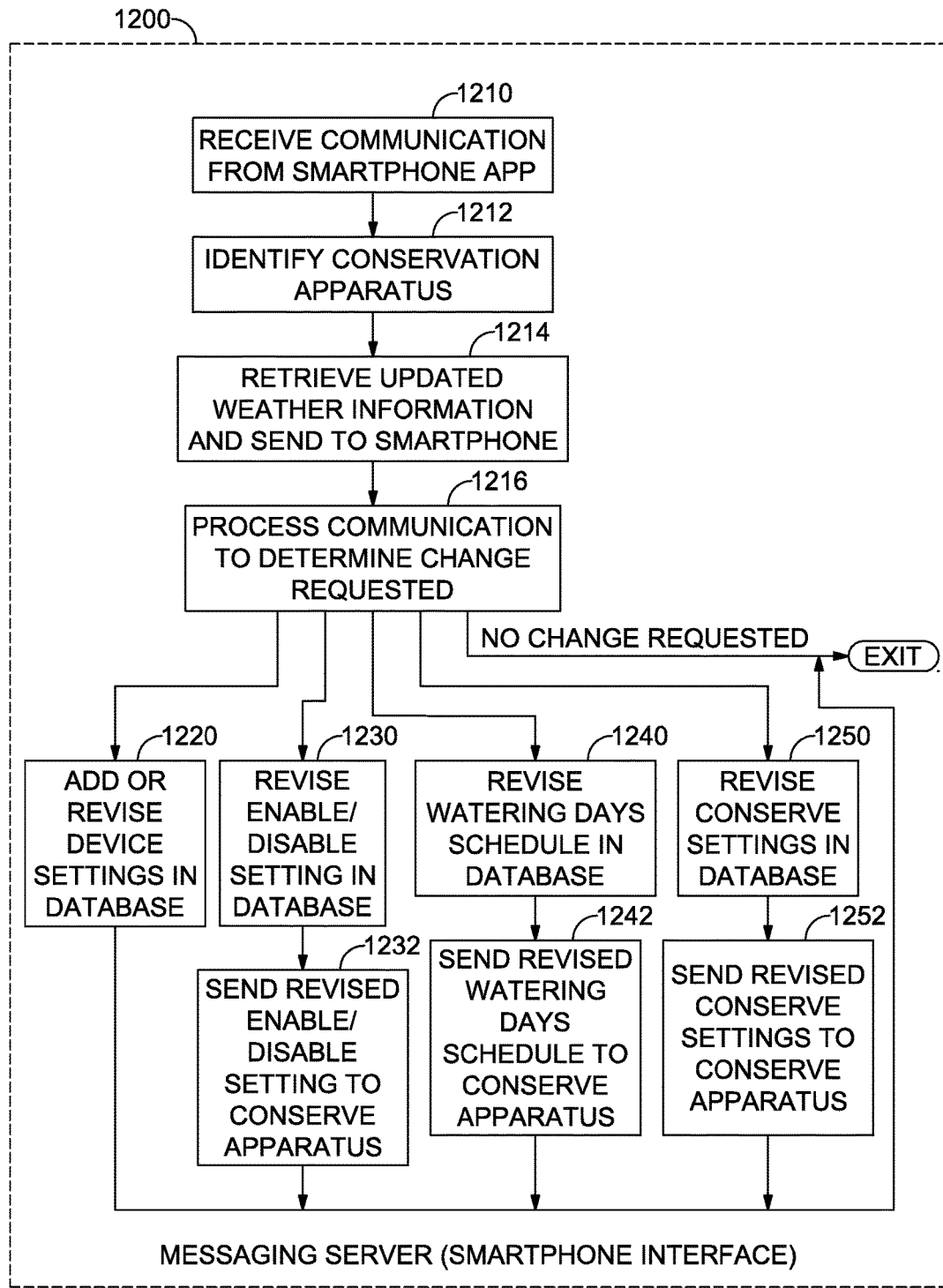
FIG. 16 illustrates a flow chart of the smartphone interface process of the messaging server that communicates with the smartphone or other user device to receive new device settings and to control the operation of the water conservation apparatus.

FIG. 16 illustrates a flow chart of a smartphone interface process 1200 of the messaging server 956 that communicates with the smartphone 952 or other user device to receive new device settings and to control the operation of the water conservation apparatus. The smartphone interface process starts in a process block 1210 wherein the messaging server receives a new communication from the smartphone application described above with respect to FIG. 15. In the illustrated embodiment, the smartphone interface process processes the new communication in a process block 1212 to identify the conservation apparatus 200 associated with the smartphone sending the new communication. Then, in a process block 1214, the process causes the messaging server to determine the current weather conditions for the location of the conservation apparatus and to send the weather conditions to the smartphone to be displayed to the user.

The smartphone interface process 1200 then advances to a process block 1216 wherein the process determines whether the communication includes a setting change request. If no setting change is requested, the process exits and waits for the next communication from the smartphone.

If the smartphone interface process 1200 determines that the smartphone has sent new or revised device settings, the process advances from the process block 1216 to a process block 1220 wherein the process adds or changes the device settings in a database associated with the particular conservation apparatus 200 for which the smartphone communicated updates. For example, if the information received from the smartphone is for a new account, the process creates a new account and stores the identification information in the database in association with the device. If the user replaces the conservation apparatus 200 for an existing account or moves the conservation apparatus to a new location, the process stores the revised information in the database for the account. After storing the new or revised device information, the process exits and waits for the next communication from the smartphone.

If the smartphone interface process 1200 determines that the smartphone has sent a disable or enable device request, the process advances from the process block 1216 to a process block 1230 wherein the process saves the new enable or disable status in the database for the device. The process then advances to a process block 1234 wherein the messaging server 956 sends a command to the conservation apparatus 200 to either enable watering or disable watering in accordance with the request from the smartphone 952. After sending the command to the conservation apparatus, the process exits and waits for the next communication from the smartphone.

If the smartphone interface process 1200 determines that the smartphone has sent a request to change the schedule of allowable watering days, the process advances from the process block 1216 to a process block 1240 wherein the process saves the schedule of allowable watering days in the database. The process then advances to a process block 1242 wherein the messaging server 956 sends a command to the conservation apparatus 200 to cause the conservation apparatus to store the information regarding allowable watering days in the local flash memory 670 (FIG. 6). After sending the command to the conservation apparatus, the process exits and waits for the next communication from the smartphone.

If the smartphone interface process 1200 determines that the smartphone has sent a request to change the conservation (conserve) settings, the process advances from the process block 1216 to a process block 1250 wherein the process saves the conservation settings communicated from the smartphone. After saving the conservation settings in the database, the process exits and waits for the next communication from the smartphone. The conservation settings are not communicated to the conservation apparatus. Rather, the messaging server 956 processes the conservation settings as described below with respect to FIG. 17.

Figure 17:
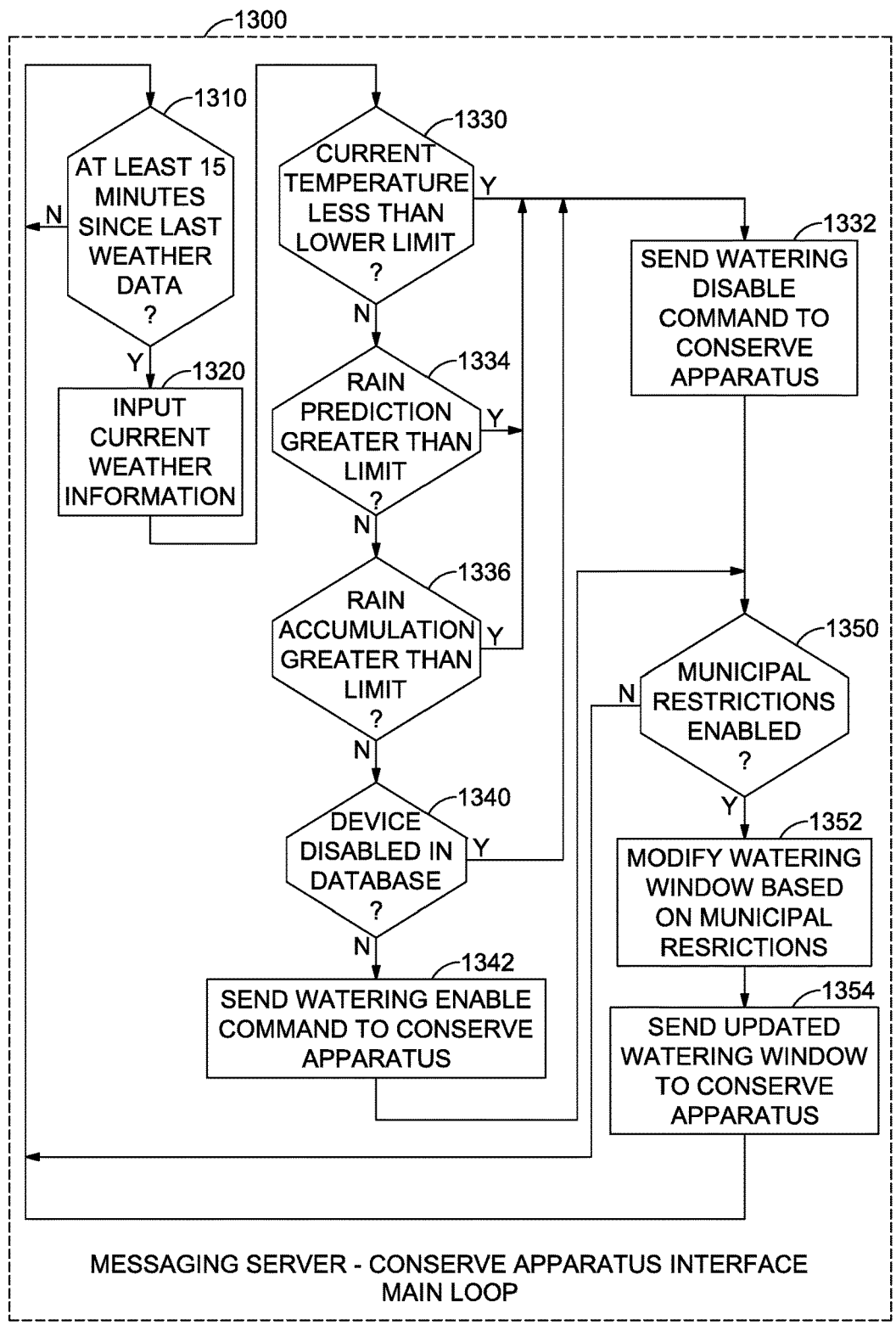
FIG. 17 illustrates a flow chart of the main operational loop of the messaging server to communicate with the conservation apparatus to control the operation of the water conservation apparatus.

FIG. 17 illustrates a flow chart of the main operational process 1300 of the messaging server 956 according to which the messaging server communicates automatically with the conservation apparatus 200 to control the operation of the water conservation apparatus in response to varying weather conditions. As discussed above, with respect to the smartphone process 1060 in FIG. 15, the conservation settings allow the user to selectively disable watering based on past (e.g., accumulated rainfall), current (e.g., temperature) and predicted (e.g., future rainfall) weather conditions. The main operational loop in FIG. 17 monitors the weather conditions relevant to the particular conservation apparatus and controls the conservation apparatus to avoid watering when the current or predicted conditions are outside adjustable limits.

The main operational process 1300 includes a decision block 1310 wherein the process determines whether the weather conditions for a particular conservation apparatus have been updated within a predetermined time. For example, in the illustrated embodiment, the decision block determines whether the current time is at least 15 minutes after a previous update. The predetermined time between updated can be increased or decreased; however, every 15 minutes has been found to be acceptable. When the predetermined time has elapsed, the process advances to a process block 1320 wherein the messaging server 906 requests weather information from a conventional weather service provider (e.g., the National Weather Service/NOAA). The weather information is requested specifically for the location of the conservation apparatus 200. The weather information includes the current temperature at the location, the accumulated rainfall (e.g., for the current day, for the previous two days and for the previous seven days), and a prediction of the likelihood of new rainfall over the next 24 hours.

After receiving the weather information, the process 1300 proceeds to a temperature-based decision block 1330 wherein the current temperature at the location of the conservation apparatus 200 is compared to the stored minimum temperature selected by the user in the smartphone process 1060 in FIG. 15. If the current temperature is less than the stored minimum temperature, the process advances to a process block 1332 wherein the messaging server 956 sends a watering disable command to the conservation apparatus to turn off the relay and thereby disable watering for at least the next 15 minutes. The watering disable command caused by weather conditions is not saved in the database; however, the current disabled status is displayed as a "watering denied" message on the smartphone app to inform the user that irrigation is not occurring because of weather conditions.

If the current temperature is not less than the limit, the process 1300 advances from the temperature based decision block 1330 to a rain prediction-based decision block 1334 wherein the current rain prediction percentage is compared to the user selected maximum percentage. If the current rain prediction percentage exceeds the selected maximum percentage, the process advances to the process block 1332 wherein the messaging server 956 sends the watering disable command to the conservation apparatus 200 as described above.

If the current rain prediction percentage is not greater than the user selected maximum percentage, the process 1300 advances from the rain prediction-based decision block 1334 to a rain accumulation-based decision block 1336 wherein the accumulated rainfall over the previous periods (e.g., the current day, the last two days and the last seven days) is compared to the user selected maximum accumulations for each of the periods. If the accumulated rainfall exceeds the selected maximum accumulation for at least one of the periods, the process advances to the process block 1332 wherein the messaging server 956 sends the watering disable command to the conservation apparatus 200 as described above.

If the accumulated rainfall does not exceed the selected maximum accumulation for any of the previous periods, the process 1300 advances from the accumulation-based decision block 1336 to an enable/disable decision block 1340 wherein the process determines whether the on/off setting stored in the database in the process block 1232 (FIG. 16) is on or off. If the stored setting is "on" (i.e., not disabled), which indicates the user has not requested that the watering be disabled, the process advances to a process block 1342 wherein the messaging server sends a command to the conservation apparatus 200 to turn on the relay 420 (FIG. 5) to enable watering. If the watering is already enabled from a previous pass through the process, the watering remains enabled. If the stored setting is "off," which indicates the user has requested that the watering be disabled (e.g., to avoid watering before or during an outdoor event), the process advances to the process block 1332 and sends a watering disable command to the water conservation apparatus.

After completing the process block 1332 or the process block 1342, the process 1300 advances to a municipal restrictions decision block 1350. In the municipal restrictions decision block, the process determines whether the conservation apparatus 200 is located in an area subject to watering restrictions based on publicly available information for the area. If the area is not subject to watering restrictions, the process returns to the decision block 1310 to wait until another predetermined period has elapsed.

If the conservation apparatus is located in an area subject to water restrictions, the process advances from the municipal restrictions decision block 1350 to a process block 1352 wherein the process modifies a watering window based on the water restrictions for the location. For example, the watering window can be modified by excluding certain days of the week, certain hours of the day, or other parameters. After the watering window is modified based on municipal restrictions, the messaging server 956 sends the updated watering window to the conserve apparatus 200 in a process block 1354. The process then returns to the decision block 1310 to wait until another predetermined period has elapsed.

Figure 18:
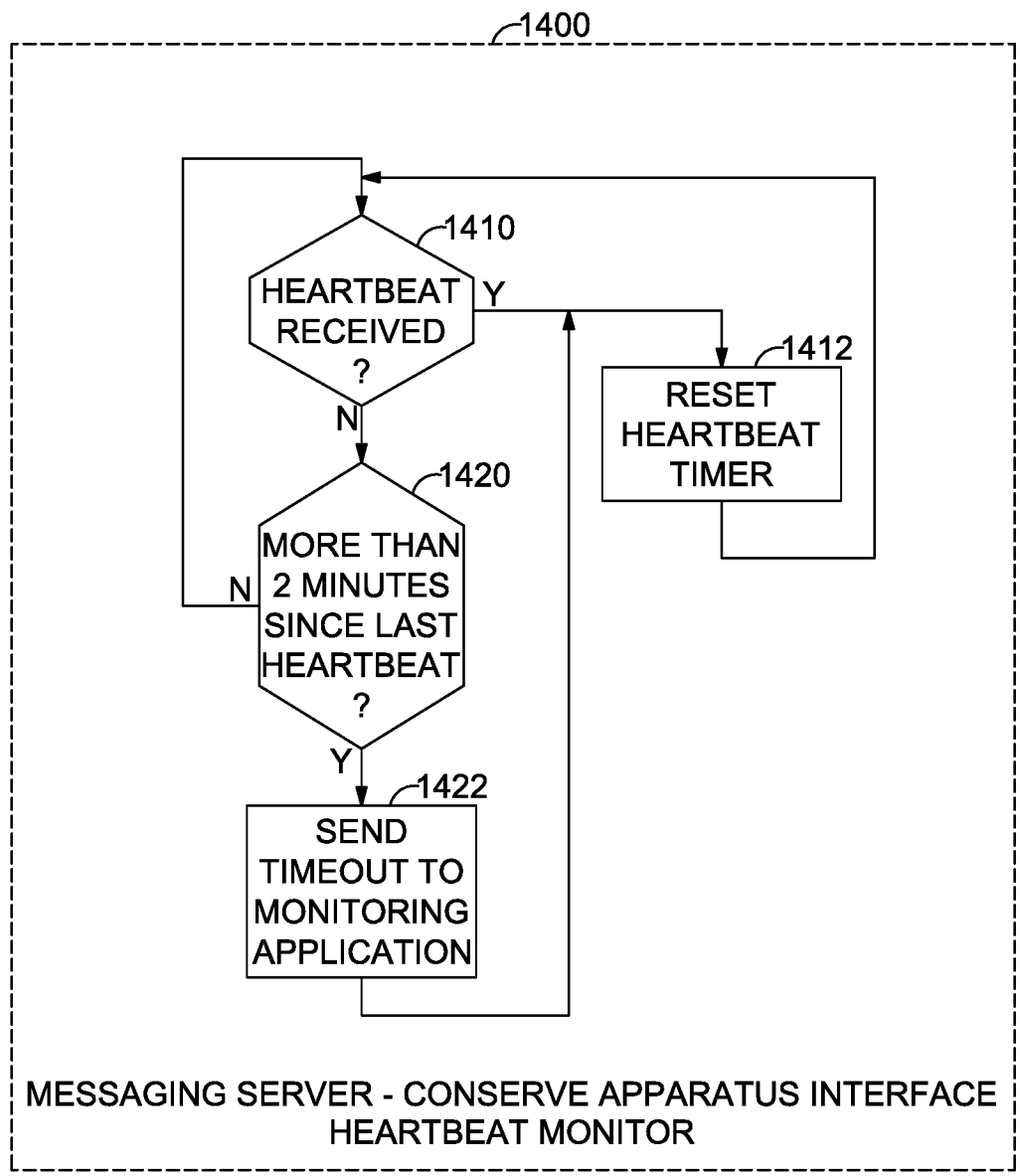
FIG. 18 illustrates a flow chart of a monitoring loop of the messaging server to receive periodic communications from the water conservation apparatus and to determine a timeout condition of no periodic communication is received within a specified time window.

As discussed above with respect to FIG. 14, the conservation apparatus 200 sends a periodic heartbeat to the messaging server 956 to confirm to the messaging server that the conservation apparatus is still online and to provide an update of the current Internet address of the conservation apparatus. FIG. 18 illustrates a flow chart of a monitoring process 1400 of the messaging server to receive periodic heartbeat from the water conservation apparatus and to determine a timeout condition of no periodic heartbeat is received within a specified time window. The monitoring process includes a first decision block 1410 which checks to see if a heartbeat is received. If a heartbeat is received, the process advances to a process block 1412 wherein the process resets the heartbeat timer. If a heartbeat is not received, the process advances to a second decision block 1420 wherein the process accesses the heartbeat timer to determine whether more than two minutes have elapsed since the last received heartbeat. If no more than two minutes have elapsed, the process returns to the decision block 1310 and repeats the foregoing process. If more than two minutes have elapsed, the process advances to a process block 1422 wherein the process sends a timeout indicator to a monitoring application (not shown) associated with the messaging server. The process than advances to the process block 1412 to reset the heartbeat timer. The monitoring application evaluates the timeouts received from the messaging server and determines when to send an email or other message to the user. For example, the monitoring application may wait for a predetermined period (e.g., an hour) before sending a message to the user in order to allow the conservation apparatus to return to service, such as, for example, after a power outage.

In the foregoing description, flow charts are used to describe the various processes performed by the conservation apparatus 200, the smartphone 952 and the messaging server 956. The flow charts are intended to illustrate the overall operations of the three devices and the communications between the devices. The flow charts are not intended to represent any specific implementation of the described processes.

As various changes could be made in the above constructions without departing from the scope of the invention, it is intended that all the matter contained in the above description or shown in the accompanying drawings shall be interpreted as illustrative and not in a limiting sense.

What is claimed is:
1. A water conservation apparatus, comprising;
an enclosure;
an electronic circuit board housed within the enclosure, the electronic circuit board having at least a first terminal and a second terminal, the first terminal and the second terminal electrically connectable to a non-networked irrigation controller; and electronic circuitry on the electronic circuit board, the electronic circuitry including an electronic switch operable to selectively electrically interconnect and disconnect the first terminal and the second terminal, the electronic circuitry further including a radio frequency (RF) communication module to selectively receive RF communications, the electronic circuitry responsive to at least a first RF communication to activate the electronic switch to electrically interconnect the first terminal and the second terminal to enable current to flow from the non-networked irrigation controller to the first terminal and to flow back to the non-networked controller from the second terminal, the electronic circuitry responsive to at least a second RF communication to deactivate the electronic switch to electrically disconnect the first terminal and the second terminal to disable current from flowing from the non-networked irrigation controller to the first terminal and flowing back to the non-networked controller from the second terminal.

2. The water conservation apparatus of claim 1, wherein the water conservation apparatus sends and receives RF communications to and from a Wi-Fi router, the Wi-Fi router communicating with a messaging server via the Internet to receive commands from the messaging server and to forward the commands to the electronic circuitry as the first RF communication and the second RF communication.

3. The water conservation apparatus of claim 2, wherein the water conservation apparatus also transmits parameters to and receives parameters from a smartphone or other computing device via a Bluetooth interconnection during a setup process, the parameters including information to establish communications between the water conservation apparatus and the Wi-Fi router.

4. The water conservation apparatus of claim 2, wherein the water conservation apparatus periodically sends RF communications to the messaging server via the Wi-Fi router to establish and maintain an Internet communications channel between the water conservation apparatus and the messaging server.

5. The water conservation apparatus of claim 1, wherein:
when the switch electrically interconnects the first terminal and the second terminal of the electronic circuit board, the non-networked irrigation controller is enabled to provide current to at least one selected water control valve in accordance with a watering schedule previously programmed into the irrigation controller; and
when the switch electrically disconnects the first terminal and the second terminal of the electronic circuit board, the non-networked irrigation controller is disabled from providing current to any water control valve regardless of the watering schedule previously programmed into the irrigation controller.

6. The water conservation apparatus of claim 1, wherein:
the first terminal of the electronic circuit board of the water conservation apparatus is electrically connectable to a first rain sensor terminal of a non-networked irrigation controller; and
the second terminal of the electronic circuit board of the water conservation apparatus is electrically connectable to a second rain sensor terminal of the non-networked irrigation controller.

7. The water conservation apparatus of claim 1, wherein the first and second terminals of the water conservation apparatus are connected between a common control valve terminal and a common control valve return wire of the non-networked irrigation controller to selectively interrupt current flow from the common control valve return wire to the common control valve terminal.

8. The water conservation apparatus of claim 1, wherein the electronic circuit board further includes a third terminal and a fourth terminal, the third and fourth terminals connected to an auxiliary power source within the non-networked irrigation controller to provide power to the electronic circuit board.

9. A method for controlling a non-networked irrigation controller, the method, comprising;
electrically interconnecting a water conservation apparatus to a first terminal and a second terminal within the irrigation controller; and
sending commands from a messaging server to the water conservation apparatus via a Wi-Fi router in radio frequency (RF) communication with the water conservation apparatus, wherein:
the water conservation apparatus is responsive to a first command from the messaging server to selectively activate an electronic switch within the water conservation apparatus to close a current path between the first terminal and the second terminal within the irrigation controller; and
the water conservation apparatus is responsive to a second command from the messaging server to selectively deactivate the electronic switch within the water conservation apparatus to open the current path between the first terminal and the second terminal within the irrigation controller.

10. The method of claim 9, wherein the first and second terminals within the irrigation controller are rain sensor terminals.

11. The method of claim 9, wherein the first and second terminals within the irrigation controller are a common control valve terminal and a common control valve return wire, the water conservation apparatus operable to selectively interrupt current flow from the common control valve return wire to the common control valve terminal.

12. The method of claim 9, where the water conservation apparatus is programmable to selectively enable current flow between the first terminal and the second terminal only during a watering window.

13. A system for conserving water by controlling the operation of a non-networked irrigation controller to selectively override a watering schedule programmed in the irrigation controller, the system comprising:
a water conservation apparatus having at least a first terminal and a second terminal, the first terminal and the second terminal electrically connectable to the non-networked irrigation controller, wherein:
the water conservation apparatus selectively activates a switch to close a current path between the first terminal and the second terminal to enable the irrigation controller to provide current to water control valves in accordance with the watering schedule programmed into the irrigation controller;
the water conservation apparatus selectively deactivates the switch to open the current path between the first terminal and the second terminal to disable the irrigation controller from providing current to the water control valves irrespective of the watering schedule programmed into the irrigation controller; and
the water conservation device selectively activates and deactivates the switch to selectively close and selectively open the current path in accordance with commands received via Wi-Fi communications;

a messaging server that receives and stores communication parameters to enable the messaging server to communicate with the water conservation apparatus, the messaging server further receiving water conservation parameters, the messaging server responsive to the water conservation parameters to generate and send commands to the water conservation apparatus to control the opening and closing of the current path; and a smartphone or other computing device, wherein:
the smartphone or other computing device executes an initialization process by which the smartphone or other computing device communicates with the water conservation apparatus by a local radio frequency communications protocol to set up the water conservation apparatus to thereby establish the communication parameters to enable the messaging server to communicate with the water conservation apparatus via Wi-Fi communications; and the smartphone or other computing device executes an operational process by which the smartphone or other computing device communicates with the messaging server to request the messaging server to modify the water conservation parameters and to cause the messaging server to send the water conservation parameters to the water conservation apparatus.

14. The system as defined in claim 13, wherein:
the messaging server receives information that identifies the location where the water conservation apparatus is installed; and
the water conservation parameters include at least one parameter responsive to weather conditions at the location where the water conservation apparatus is installed, the weather conditions including at least one of:
current temperature at the location;
accumulated rainfall at the location during a predetermined period before the current day and time; and
predicted rainfall at the location for the current day.

15. The system as defined in claim 13, wherein the first and second terminals of the water conservation apparatus are connected to rainfall sensors of the non-networked irrigation controller.

16. The system as defined in claim 13, wherein the first and second terminals of the water conservation apparatus are connected between a common control valve terminal and a common control valve return wire of the non-networked irrigation controller.

* * * * *